US011968720B2

(12) United States Patent
Taherzadeh Boroujeni et al.

(10) Patent No.: US 11,968,720 B2
(45) Date of Patent: Apr. 23, 2024

(54) ALTERNATIVE TWO-STEP RACH PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 17/190,723

(22) Filed: Mar. 3, 2021

(65) Prior Publication Data

US 2021/0315016 A1 Oct. 7, 2021

Related U.S. Application Data

(60) Provisional application No. 63/005,053, filed on Apr. 3, 2020.

(51) Int. Cl.
*H04W 74/08* (2009.01)
*H04W 56/00* (2009.01)
*H04W 72/0446* (2023.01)
*H04W 72/0453* (2023.01)
*H04W 72/23* (2023.01)
*H04W 74/00* (2009.01)
*H04W 74/0833* (2024.01)

(52) U.S. Cl.
CPC ..... *H04W 74/0833* (2013.01); *H04W 56/001* (2013.01); *H04W 72/0446* (2013.01); *H04W 72/0453* (2013.01); *H04W 72/23* (2023.01); *H04W 74/008* (2013.01)

(58) Field of Classification Search
None
See application file for complete search history.

(56) References Cited

U.S. PATENT DOCUMENTS

| 2019/0037604 A1* | 1/2019 | Akkarakaran | ...... H04W 74/006 |
| 2020/0107369 A1* | 4/2020 | Jeon | ..................... H04W 74/006 |

(Continued)

FOREIGN PATENT DOCUMENTS

WO  WO-2019096679 A1  5/2019

OTHER PUBLICATIONS

International Search Report and Written Opinion—PCT/US2021/070235—ISA/EPO—dated Jun. 23, 2021.

(Continued)

*Primary Examiner* — Srinivasa R Reddivalam
(74) *Attorney, Agent, or Firm* — Harrity & Harrity, LLP

(57) ABSTRACT

Various aspects of the present disclosure generally relate to wireless communication. In some aspects, a user equipment may perform an initial random access channel (RACH) attempt by transmitting, to a base station, an initial request message of an initial two-step RACH procedure; and perform an additional RACH attempt, using an alternative two-step RACH procedure, based at least in part on determining that an initial response message, corresponding to the initial request message, of the two-step RACH procedure is not received during an initial random access response window. Numerous other aspects are provided.

30 Claims, 7 Drawing Sheets

(56) References Cited

U.S. PATENT DOCUMENTS

2021/0058971 A1* 2/2021 MolavianJazi ....... H04L 5/0044
2022/0264659 A1* 8/2022 Enbuske ............. H04W 74/002

OTHER PUBLICATIONS

Panasonic: "Discussion on 2-Step RACH Procedure", 3GPP Draft, 3GPP TSG RAN WG1 #99, R1-1912746, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820182, 9 Pages, Retrieved from the Internet: URL: https://ftp.3gpp.org/tsg_ran/WG1_RL1/TSGR1_99/Docs/R1-1912746. zip. R1-1912746.docx [retrieved on Nov. 8, 2019] the whole document.

Qualcomm Incorporated: "Procedures for Two-Step RACH", 3GPP Draft, 3GPP TSG-RAN WG1 Meeting #98, R1-1909240, Procedures for Two-Step RACH, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765845, 15 Pages, Retrieved from the Internet: URL: http://www.3gpp.org/ftp/tsg_ran/WG1_RL1/TSGR1_98/Docs/R1-1909240.zip. [retrieved on Aug. 17, 2019] the whole document.

* cited by examiner

ALTERNATIVE TWO-STEP RACH PROCEDURE

CROSS-REFERENCE TO RELATED APPLICATION

This patent application claims priority to U.S. Provisional Patent Application No. 63/005,053, filed on Apr. 3, 2020, entitled "ALTERNATIVE TWO-STEP RACH PROCEDURE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for an alternative two-step random access channel procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include performing an initial random access channel (RACH) attempt by transmitting, to a base station, an initial request message of an initial two-step RACH procedure; and performing an additional RACH attempt, using an alternative two-step RACH procedure, based at least in part on determining that an initial response message, corresponding to the initial request message, of the two-step RACH procedure is not received during an initial random access response (RAR) window.

In some aspects, a method of wireless communication, performed by a base station, may include receiving, from a UE, an initial request message of an initial two-step RACH procedure, wherein the initial request message corresponds to an initial RACH attempt; and receiving an additional request message of an alternative two-step RACH procedure, wherein the additional request message corresponds to an additional RACH attempt performed by the UE based at least in part on a failure of the UE to receive an initial response message, corresponding to the initial request message, during an initial RAR window.

In some aspects, a UE for wireless communication may include a memory and one or more processors operatively coupled to the memory. The memory and the one or more processors may be configured to perform an initial RACH attempt by transmitting, to a base station, an initial request message of an initial two-step RACH procedure; and perform an additional RACH attempt, using an alternative two-step RACH procedure, based at least in part on determining that an initial response message, corresponding to the initial request message, of the two-step RACH procedure is not received during an initial RAR window.

In some aspects, a base station for wireless communication may include a memory and one or more processors operatively coupled to the memory. The memory and the one or more processors may be configured to receive, from a UE, an initial request message of an initial two-step RACH procedure, wherein the initial request message corresponds to an initial RACH attempt; and receive an additional request message of an alternative two-step RACH procedure, wherein the additional request message corresponds to an additional RACH attempt performed by the UE based at least in part on a failure of the UE to receive an initial response message, corresponding to the initial request message, during an initial RAR window.

In some aspects, a non-transitory computer-readable medium may store one or more instructions for wireless communication. The one or more instructions, when executed by one or more processors of a UE, may cause the one or more processors to perform an initial RACH attempt by transmitting, to a base station, an initial request message of an initial two-step RACH procedure; and perform an additional RACH attempt, using an alternative two-step RACH procedure, based at least in part on determining that an initial response message, corresponding to the initial request message, of the two-step RACH procedure is not received during an initial RAR window.

In some aspects, a non-transitory computer-readable medium may store one or more instructions for wireless communication. The one or more instructions, when executed by one or more processors of a base station, may cause the one or more processors to receive, from a UE, an initial request message of an initial two-step RACH procedure, wherein the initial request message corresponds to an initial RACH attempt; and receive an additional request message of an alternative two-step RACH procedure, wherein the additional request message corresponds to an additional RACH attempt performed by the UE based at least in part on a failure of the UE to receive an initial response message, corresponding to the initial request message, during an initial RAR window.

In some aspects, an apparatus for wireless communication may include means for performing an initial RACH attempt by transmitting, to a base station, an initial request message of an initial two-step RACH procedure; and means for performing an additional RACH attempt, using an alternative two-step RACH procedure, based at least in part on determining that an initial response message, corresponding to the initial request message, of the two-step RACH procedure is not received during an initial RAR window.

In some aspects, an apparatus for wireless communication may include means for receiving, from a UE, an initial request message of an initial two-step RACH procedure, wherein the initial request message corresponds to an initial RACH attempt; and means for receiving an additional request message of an alternative two-step RACH procedure, wherein the additional request message corresponds to an additional RACH attempt performed by the UE based at least in part on a failure of the UE to receive an initial response message, corresponding to the initial request message, during an initial RAR window.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
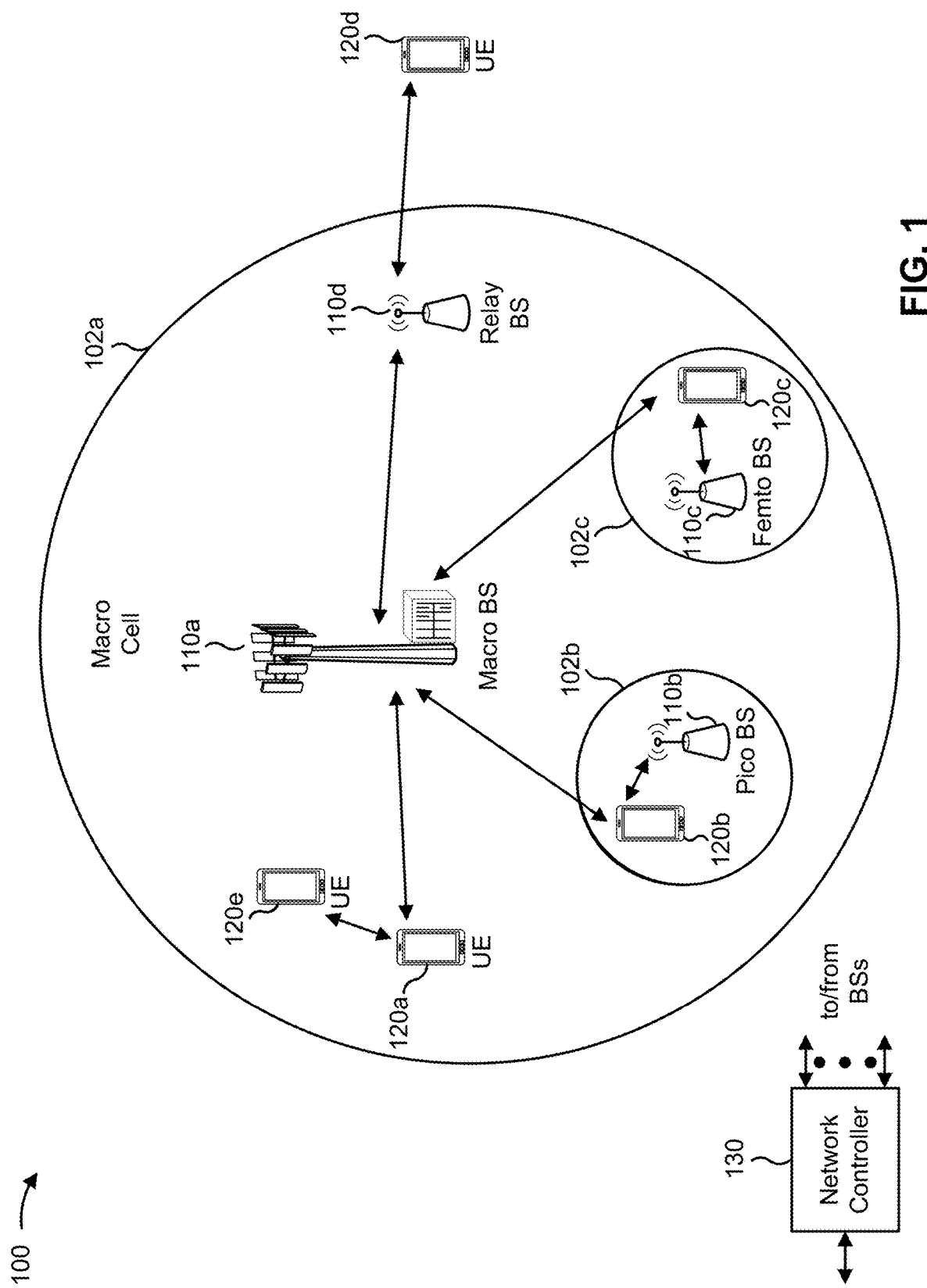
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
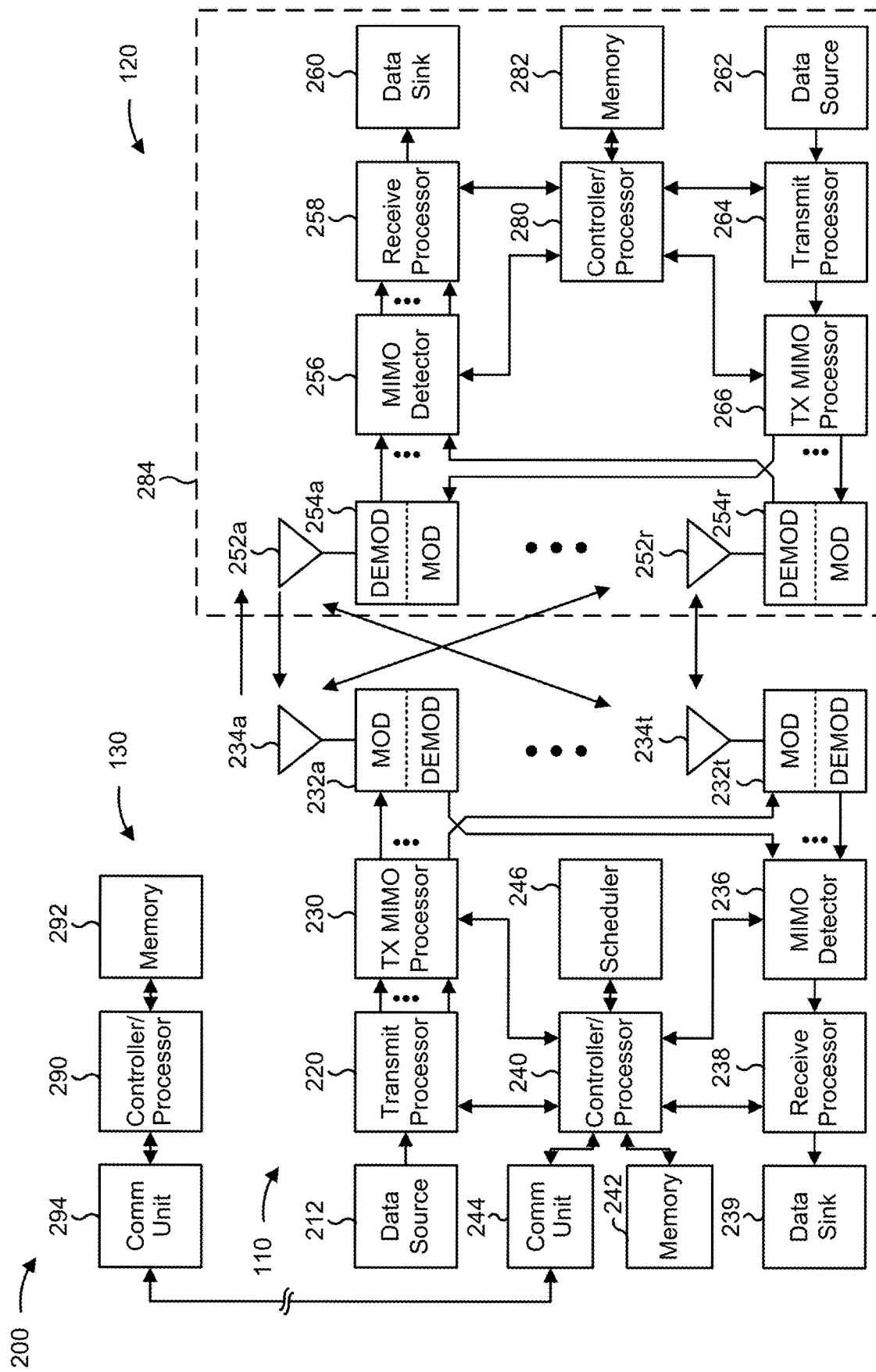
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 2-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 2-7).

Controller/processor 240 of base station 110, controller/processor 280 of UE 120, and/or any other component(s) of FIG. 2 may perform one or more techniques associated with an alternative two-step random access channel (RACH) procedure, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for performing an initial RACH attempt by transmitting, to a base station, an initial request message of an initial two-step RACH procedure, means for performing an additional RACH attempt, using an alternative two-step RACH procedure, based at least in part on determining that an initial response message, corresponding to the initial request message, of the two-step RACH procedure is not received during an initial random access response (RAR) window, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an initial request message of an initial two-step RACH procedure, wherein the initial request message corresponds to an initial RACH attempt, means for receiving an additional request message of an alternative two-step RACH procedure, wherein the additional request message corresponds to an additional RACH attempt performed by the UE based at least in part on a failure of the UE to receive an initial response message, corresponding to the initial request message, during an initial RAR window, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
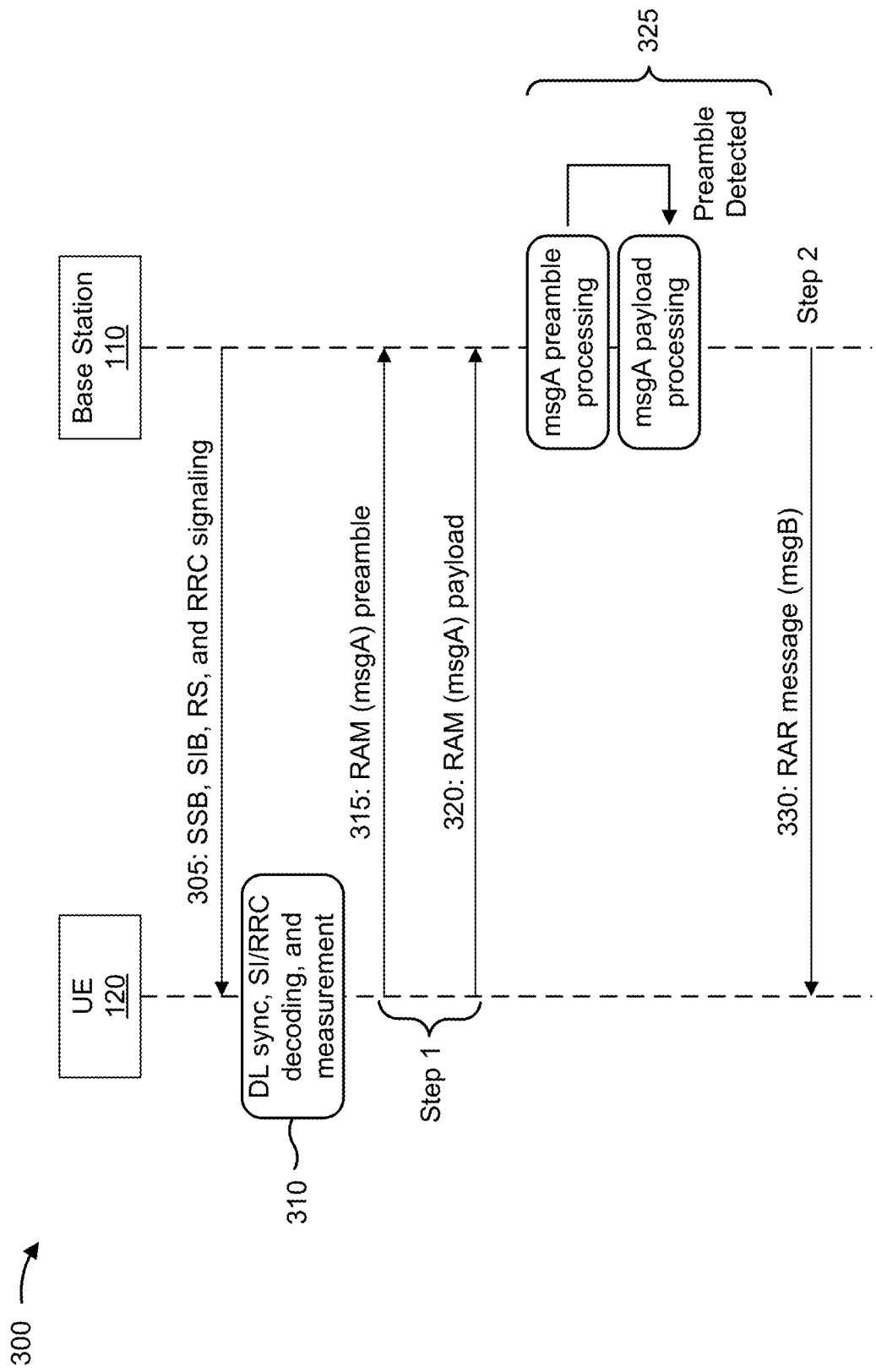
FIG. 3 is a diagram illustrating an example two-step random access channel (RACH) procedure, in accordance with the present disclosure.

FIG. 3 is a diagram illustrating an example two-step RACH procedure 300, in accordance with the present disclosure. As shown in FIG. 3, a base station 110 and a UE 120 may communicate with one another to perform the two-step RACH procedure.

In a first operation 305, the base station 110 may transmit, and the UE 120 may receive, one or more synchronization signal blocks (SSBs), system information blocks (SIBs), reference signals (RSs), radio resource control (RRC) signaling messages, and/or the like. For example, as described in further detail elsewhere herein, the SSBs, SIBs, RSs, RRC signaling messages, and/or the like may include information related to one or more RACH occasion (RO) configurations, such as information related to one or more ordered preamble resources. In a second operation 310, the UE 120 may perform downlink (DL) synchronization (e.g., using one or more SSBs), decode system information (SI) and/or RRC configuration information included in one or more SIBs, perform one or more measurements of the RS(s), and/or the like. Based at least in part on performing the second operation 310, the UE 120 may determine one or more parameters for transmitting a random access message (RAM) in the two-step RACH procedure. For example, the UE 120 may determine one or more physical random access channel (PRACH) transmission parameters to be used to transmit the RAM, may determine one or more parameters for generating a preamble of the RAM, may identify one or more uplink resources on which the RAM is to be transmitted, and/or the like.

In a third operation 315, the UE 120 may transmit a RAM preamble. In a fourth operation 320, the UE 120 may transmit a RAM payload. As shown, the UE 120 may transmit the RAM preamble and the RAM payload as part of a first step of the two-step RACH procedure. The RAM is sometimes referred to as message A, msgA, an uplink message, a first (or initial) message in a two-step RACH procedure, a request message, and/or the like. The RAM preamble is sometimes referred to as a message A preamble, a msgA preamble, a preamble, and/or the like. The RAM payload is sometimes referred to as a message A payload, a msgA payload, a payload, and/or the like. In some aspects, the RAM may include some or all of the contents of message 1 (msg1) and message 3 (msg3) of a four-step RACH procedure. For example, the RAM preamble may include some or all contents of message 1 (e.g., a RACH preamble), and the RAM payload may include some or all contents of message 3. For example, in some aspects, the RAM payload may include an identifier associated with the UE 120, uplink control information, a medium access control (MAC) layer control element (e.g., a power headroom report, a buffer status report, a beam failure report, a channel state report, and/or the like), user plane data, control plane data, and/or the like. Furthermore, in some aspects, the msgA preamble and the msgA payload may be time division multiplexed (TDMed) with one another, whereby the msgA preamble and the msgA payload may be transmitted in separate symbols based at least in part on a time division multiplexing configuration.

In a fourth operation 325, the base station 110 may receive the RAM preamble transmitted by the UE 120. If the base station 110 successfully receives and decodes the RAM preamble, the base station 110 may then receive and decode the RAM payload. In a fifth operation 330, the base station 110 may transmit a random access response (RAR) message. As shown, the base station 110 may transmit the RAR message as part of a second step of the two-step RACH procedure. The RAR message is sometimes referred to as message B, msgB, a second message in a two-step RACH procedure, a response message, and/or the like. The RAR message may include some or all of the contents of message 2 (msg2) and msg4 of a four-step RACH procedure. For example, the RAR message may include the detected RACH preamble identifier, the detected UE identifier, a timing advance value, contention resolution information, and/or the like. In some aspects, the RAR message may include a first portion transmitted via a physical downlink control channel (PDCCH) (e.g., to include some or all of the contents of msg2 of the four-step RACH procedure) and a second portion transmitted via a physical downlink shared channel (PDSCH) (e.g., to include some or all of the contents of msg4 of the four-step RACH procedure). In some aspects, based on whether the UE 120 successfully receives and decodes the RAR message, the UE may transmit hybrid automatic repeat request (HARD) feedback to the base station 110 via a physical uplink control channel (PUCCH) (e.g., an acknowledgement (ACK) to indicate that the RAR message was successfully received and decoded, or a negative acknowledgement (NACK) to indicate that the RAR message was not successfully received and decoded).

As indicated above, FIG. 3 is provided as an example. Other examples may differ from what is described with respect to FIG. 3.

Figure 4:
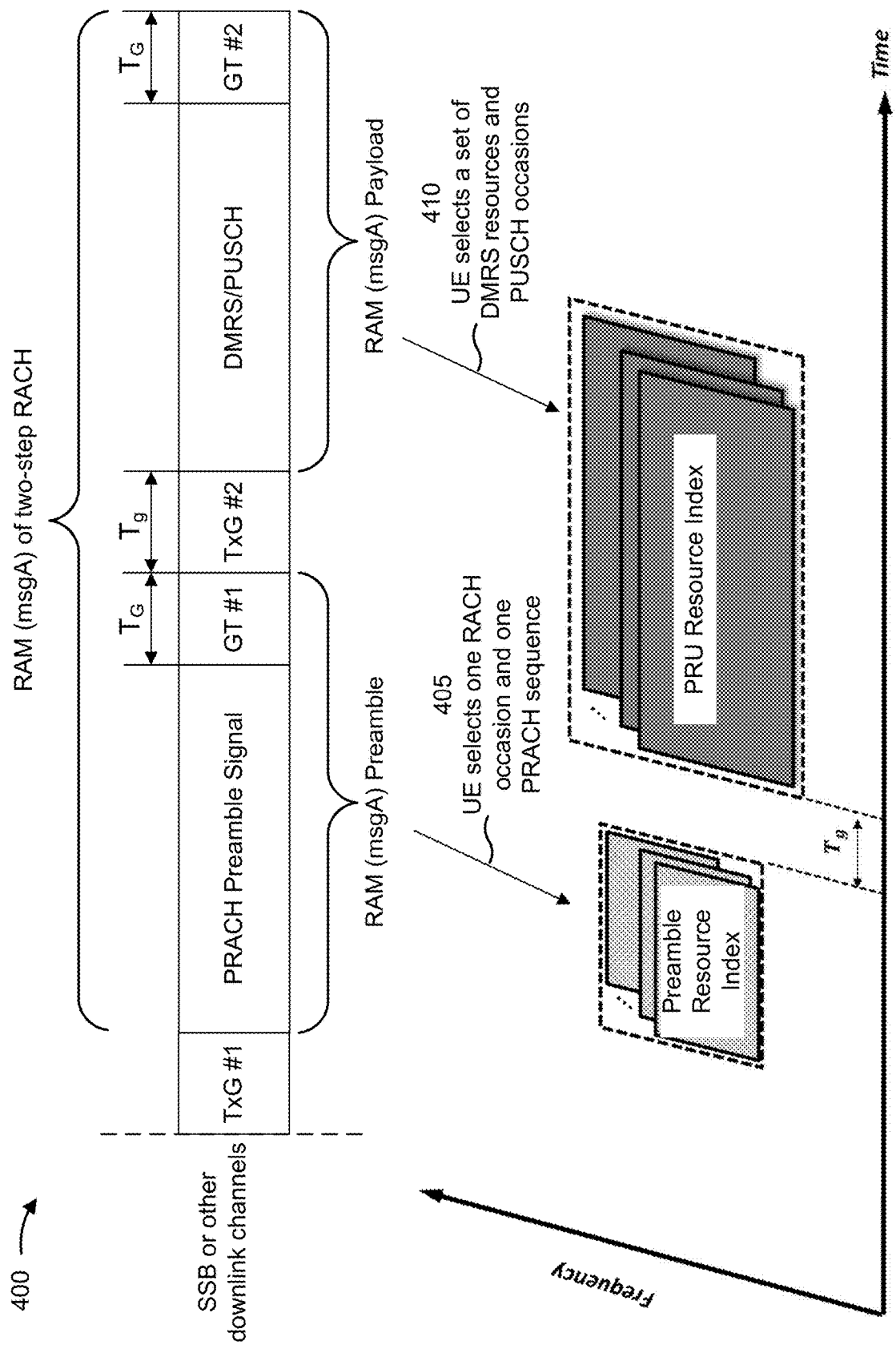
FIG. 4 is a diagram illustrating an example random access message that includes a preamble and a payload, in accordance with the present disclosure.

FIG. 4 is a diagram illustrating an example random access message 400 that includes a preamble and a payload, in accordance with the present disclosure. As shown, the random access message 400 of the two-step RACH procedure may include a preamble and a payload, as described above. The preamble may include a PRACH preamble signal and a first guard time (shown as GT #1, with a duration of TG). The payload may include a demodulation reference signal (DMRS) and/or a physical uplink shared channel (PUSCH) communication, as well as a second guard time (shown as GT #2, with a duration of TG). As further shown in FIG. 4, transmission of the preamble and transmission of the payload may be separated in time by a transmission guard time (shown as TxG, with a duration of TO.

As further shown in FIG. 4, and by reference number 405, the UE may select one RO and one PRACH sequence to be used to transmit the msgA preamble. For example, as described in further detail elsewhere herein, the UE may select the RO and the PRACH sequence based at least in part on one or more shared ROs that are configured by a base station for the two-step RACH procedure and the four-step RACH procedure, one or more dedicated ROs that are configured by the base station for the two-step RACH procedure, and/or the like. Furthermore, in some aspects, the base station may configure an ordered set of preamble resources on the shared and/or dedicated ROs, and the UE may select the PRACH sequence based at least in part on the ordered set of preamble resources. As further shown in FIG. 4, and by reference number 410, the UE may select a set of DMRS resources and PUSCH occasions to be used to transmit the msgA payload. For example, as described in further detail herein, the UE may select the set of DMRS resources/or and PUSCH occasions based at least in part on a preamble-to-PUSCH resource unit (PRU) mapping. Furthermore, in some aspects, the UE may select multiple PRUs to support frequency hopping, repetition of a PUSCH portion of a msgA payload, and/or the like.

As indicated above, FIG. 4 is provided as an example. Other examples may differ from what is described with respect to FIG. 4.

The request message (msgA) and the response message (msgB) may be bottlenecks in the coverage of millimeter-wave 5G systems. Preamble repetition and/or using different preamble formats may be helpful in increasing the msgA coverage and/or msgB coverage by facilitating base station beam refinement, but typically consume unnecessary resources. Response message (msgB PDCCH) repetition may be helpful for increasing msgB coverage, but also may consume unnecessary resources.

Various aspects of the techniques and apparatuses described herein may facilitate enhanced coverage without unnecessary increase in resource consumption. In some aspects, a UE 120 may perform an additional RACH attempt using a two-step RACH procedure based at least on determining that an initial response message was not received corresponding to an initial request message. The additional RACH attempt may be performed using an alternative RACH procedure that is different than the procedure used to perform the initial RACH attempt. In some aspects, the alternative RACH procedure may use an alternative transmission method for the msgA preamble, an alternative mapping between RACH occasions (ROs) and PUSCH resources, an alternative method for monitoring and reception of a response message, an alternative RAR window, an alternative size of DCI carried by msgB PDCCH, an alternative interpretation of content of DCI carried by msgB PDCCH, and/or the like.

In some aspects, an alternative transmission method for the msgA preamble may include transmitting multiple sequences across multiple ROs, where the multiple ROs serve as a virtual RO for the alternative msg A preamble. The sequences may be a single, repeated, sequence, multiple linked sequences, and/or the like. In this way, the base station may facilitate increasing the coverage of the RACH procedure without using unnecessary resources. In some aspects, an alternative mapping between ROs and PUSCH resources may include mapping more than one RO to a set of PUSCH resources. In this way, RACH coverage may be increased without using additional PUSCH resources. In some aspects, an alternative method for monitoring and reception of a response message may include soft combination of multiple monitoring occasions before decoding and blind detection. In this way, the msg B may be transmitted over multiple monitoring occasions to increase coverage. In some aspects, alternative RAR windows and/or DCI transmissions may be used for increasing RACH coverage with respect to a particular UE that invokes the alternative RACH procedure by using an alternative msg A transmission. In this way, RACH coverage may be increased for a particular UE without allocating additional resources for all UEs.

Figure 5:
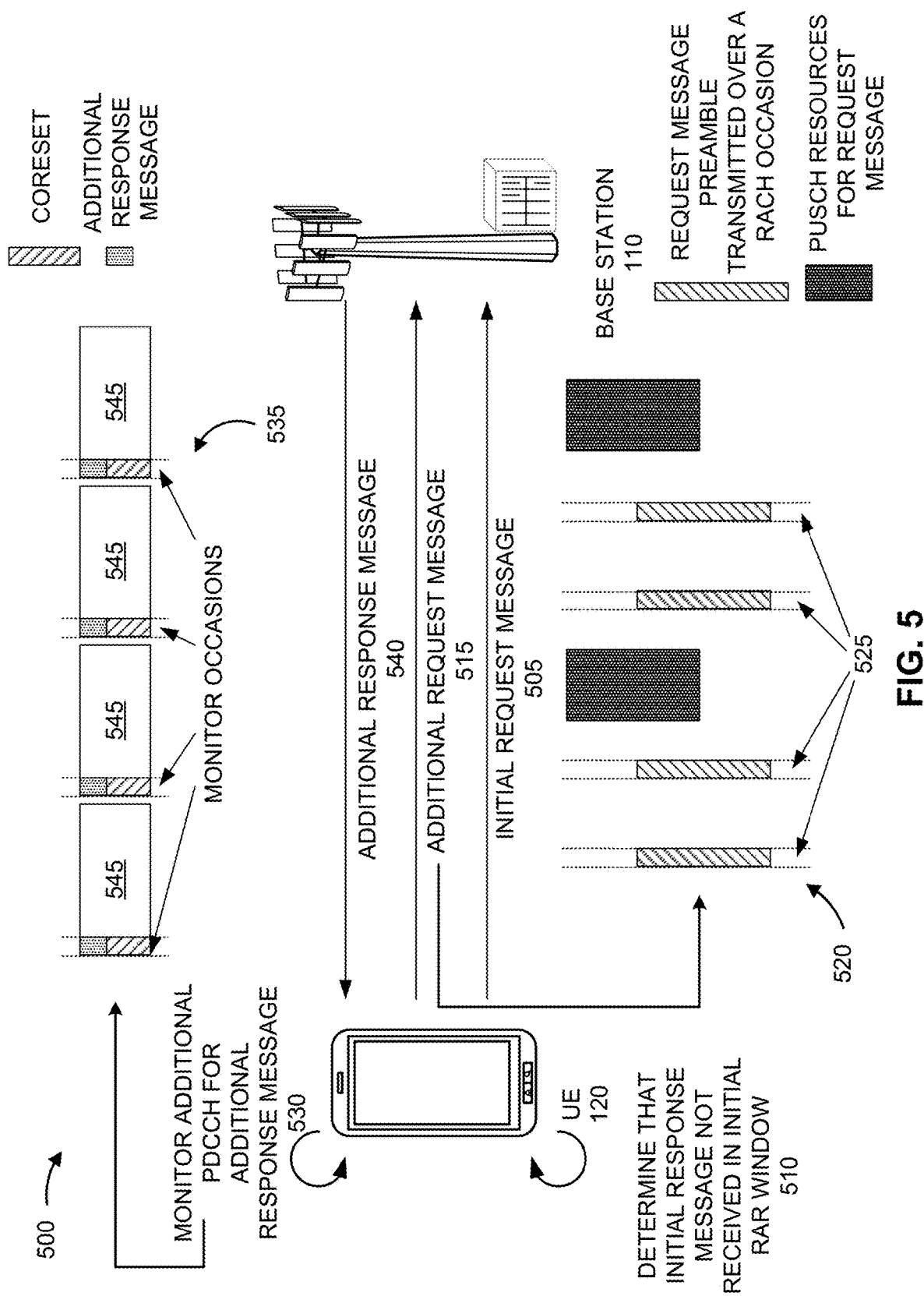
FIG. 5 is a diagram illustrating an example of an alternative two-step RACH procedure, in accordance with the present disclosure.

FIG. 5 is a diagram illustrating an example of an alternative two-step RACH procedure, in accordance with the present disclosure. As shown, a UE 120 and a base station 110 may communicate with one another.

As shown by reference number 505, the UE 120 may perform an initial RACH attempt by transmitting, to a base station 110, an initial request message of an initial two-step RACH procedure. As shown by reference number 510, the UE 120 may determine that an initial response message, corresponding to the initial request message, of the two-step RACH procedure is not received during an initial RAR window.

As shown by reference number 515, the UE 120 may perform an additional RACH attempt, using an alternative two-step RACH procedure, by transmitting an additional request message to the base station 110. In some aspects, the UE 120 may perform the additional RACH attempt based at least in part on determining that an initial response message, corresponding to the initial request message, of the two-step RACH procedure is not received during the initial RAR window. In some aspects, the UE 120 may obtain one or more measurements associated with a signal, and perform the additional RACH attempt based at least in part on the one or more measurements. In some aspects, the one or more measurements may include a synchronization signal block (SSB)-based reference signal received power (RSRP). The UE may perform the additional RACH attempt based at least in part on determining that the SSB-based RSRP satisfies a threshold.

In some aspects, transmitting the initial request message may include transmitting an initial request message preamble according to an initial transmission procedure, and performing the alternative two-step RACH procedure may include transmitting at least one additional request message preamble according to an additional transmission procedure. The additional transmission procedure may be different than the initial transmission procedure. In some aspects, the additional transmission procedure may include a coverage-enhanced transmission procedure.

In some aspects, the initial transmission procedure may be performed using a first transmit power, and the additional transmission procedure may be performed using a second transmit power that is higher than the first transmit power. In some aspects, the initial transmission procedure may be performed using a first subset of preamble sequences of a set of preamble sequences, and the additional transmission procedure may be performed using a second subset of preamble sequences of the set of preamble sequences. In some aspects, the second subset of preamble sequences may be different than the first subset of preamble sequences.

In some aspects, the initial transmission procedure may be performed using a first subset of RACH occasions (ROs) of a set of ROs and the additional transmission procedure may be performed using a second subset of ROs of the set of ROs. In some aspects, the second subset of ROs may be different than the first subset of ROs. In some aspects, the initial transmission procedure may be performed using an initial request message preamble format, and the additional transmission procedure may be performed using at least one additional request message preamble format. In some aspects, the at least one additional request message preamble format may be different than the initial request message preamble format.

As shown by reference number 520, the additional transmission procedure may be performed using a plurality of transmissions. The plurality of transmissions may correspond to a plurality of ROs 525. In some aspects, each transmission of the plurality of transmissions may be associated with a same SSB beam. In some aspects, the plurality of ROs may include a plurality of groups of ROs, where each of the plurality of groups of ROs functions as a virtual RO corresponding to the at least one additional request message preamble.

As shown, the at least one additional request message preamble may include a preamble sequence, and transmitting the at least one additional request message preamble may include transmitting the preamble sequence in a plurality of transmissions. The preamble sequence may be a regular preamble sequence defined by a wireless communication standard. In some aspects, the preamble sequence may be the same as a preamble sequence transmitted during the initial RACH attempt.

In some aspects, the at least one additional request message preamble comprises a plurality of preamble sequences that are linked to each other preamble sequence of the plurality of sequences. In some aspects, transmitting the at least one additional request message preamble may include transmitting each of the plurality of preamble sequences in a respective one of a plurality of transmissions. Each preamble sequence of the plurality of preamble sequences may be linked to each other preamble sequence of the plurality of sequences based at least in part on a wireless communication standard, a configuration received from the base station 110, and/or the like.

In some aspects, the plurality of preamble sequences may include a subset of a set of preamble sequences. In some aspects, the base station 110 may transmit, and the UE 120 may receive, a configuration of the subset of the set of preamble sequences. The configuration of the subset of the set of preamble sequences may be carried in remaining minimum system information (RMSI).

In some aspects, transmitting the initial request message may include transmitting the initial request message according to an initial mapping of an initial RO onto an initial set of PUSCH resources, and performing the alternative two-step RACH procedure may include transmitting an additional request message according to an additional mapping of an additional RO onto an additional set of PUSCH resources. In some aspects, transmitting the initial request message may include transmitting an initial uplink reference signal (RS) using the initial set of PUSCH resources, and performing the alternative two-step RACH procedure may include transmitting an additional uplink RS using the additional set of PUSCH resources. In some aspects, the additional uplink RS may facilitate beam refinement associated with the base station 110.

Transmitting the initial request message may include transmitting the initial request message according to an initial mapping of an initial RO to an initial set of PUSCH resources. As is further shown by reference number 520, performing the alternative two-step RACH procedure may include transmitting a plurality of additional request messages according to an additional mapping of a plurality of additional ROs to a plurality of additional sets of PUSCH resources.

In some aspects, as shown, the additional mapping may include a mapping of four additional ROs to two sets of additional PUSCH resources. In some aspects, the base station 110 may transmit, and the UE 120 may receive, an indication of a time domain offset between at least one of the plurality of additional ROs and at least one of the plurality of additional sets of PUSCH resources to which the at least one of the plurality of additional ROs is mapped. In some aspects, the at least one of the plurality of additional ROs may include a first RO, of the plurality of additional ROs, to occur, a third RO, of the plurality of ROs, to occur, and/or the like. In some aspects, the time domain offset may include a slot offset.

In some aspects, the base station 110 may transmit, and the UE 120 may receive, an indication of a frequency domain offset between at least one of the plurality of additional ROs and at least one of the plurality of additional sets of PUSCH resources to which the at least one of the plurality of additional ROs is mapped. In some aspects, the at least one of the plurality of additional ROs may include a first RO, of the plurality of additional ROs, to occur, a third RO, of the plurality of additional ROs, to occur, and/or the like. In some aspects, the frequency domain offset may include a subcarrier offset.

In some aspects, performing the initial two-step RACH procedure may include monitoring, according to an initial reception procedure, a PDCCH for the initial response message. As shown by reference number 530, the UE 120 may perform the alternative two-step RACH procedure by monitoring, according to an additional reception procedure, an additional PDCCH for an additional response message that corresponds to an additional request message. In some aspects, the additional reception procedure may be different than the initial reception procedure. In some aspects, the additional reception procedure may include a coverage-enhanced reception procedure.

In some aspects, as shown by reference number 535, the additional reception procedure may include monitoring a plurality of PDCCH monitoring candidates associated with a plurality of monitoring occasions. As shown by reference number 540, the base station 110 may transmit the additional response message to the UE 120. In some aspects, as shown, each of the plurality of monitoring occasions may include the additional response message. In some aspects, each of the plurality of PDCCH monitoring candidates may indicate an index associated with the additional response message, a particular location in a search space corresponding to each monitoring occasion associated with the PDCCH monitoring candidate, and/or the like. In some aspects, the plurality of PDCCH monitoring candidates may be associated with a plurality of slots 545.

In some aspects, the UE 120 may soft combine the plurality of PDCCH monitoring candidates to generate a combined PDCCH monitoring candidate. The UE 120 may decode the combined PDCCH monitoring candidate and evaluate a cyclic redundancy check (CRC) associated with the combined PDCCH monitoring candidate to determine that the combined PDCCH monitoring candidate comprises the additional response message.

As shown by reference number 535, the plurality of monitoring occasions may include a plurality of groups of monitoring occasions, and each of the plurality of groups of monitoring occasions may include a plurality of consecutive monitoring occasions corresponding to a plurality of slots 545 having an associated plurality of control resource sets (CORESETs). In some aspects, the plurality of CORESETs may function as a virtual monitoring occasion corresponding to the additional response message.

The UE 120 may perform the initial two-step RACH procedure by monitoring, during the initial RAR window, for the initial response message. In some aspects, the UE 120 may perform the alternative two-step RACH procedure by monitoring, during an additional RAR window, for the additional response message that corresponds to the additional request message. In some aspects, the additional RAR window may be different than the initial RAR window. In some aspects, the initial RAR window may have a first length and the additional RAR window may have a second length that is different than the first length. In some aspects, the base station 110 may transmit, and the UE 120 may receive, in RMSI, a configuration of the first length and the second length. In some aspects, a length of the initial RAR window may be a same length as a length of the additional RAR window.

In some aspects, the initial two-step RACH procedure may include an initial offset between transmitting the initial request message and a starting time of the initial RAR window, and the alternative two-step RACH procedure may include an additional offset between transmission of the additional request message and a starting time of the additional RAR window. In some aspects, the additional offset may be different than the initial offset. In some aspects, the UE 120 may obtain one or more measurements associated with a signal, and a length of the initial RAR window may be based at least in part on the one or more measurements. In some aspects, the one or more measurements may include an SSB-based RSRP, and the length of the initial RAR window may be shorter than a length of an additional RAR window based at least in part on the SSB-based RSRP satisfying a threshold.

In some aspects, the initial two-step RACH procedure may include an initial downlink control information (DCI) carried by the initial response message. The initial DCI may have a first size. In some aspects, the alternative two-step RACH procedure may include an additional DCI carried by an additional response message and having a second size that is different than the first size. In some aspects, the initial two-step RACH procedure may include an initial DCI, carried by the initial response message, that has content associated with a first interpretation by the UE. The alternative two-step RACH procedure may include an additional DCI, carried by an additional response message, that has content associated with a second interpretation by the UE. In some aspects, the second interpretation may be different than the first interpretation.

Aspects of the techniques described above may facilitate enhanced RACH coverage without unnecessary increase in resource consumption. In some aspects, the alternative RACH procedure described above may use an alternative transmission method for the request message preamble, an alternative mapping between ROs and PUSCH resources, an alternative method for monitoring and reception of a response message, an alternative RAR window, an alternative size of DCI carried by the response message, an alternative interpretation of the content of the DCI, and/or the like. In this way, the base station may facilitate increasing the coverage of the RACH procedure without using unnecessary resources.

As indicated above, FIG. 5 is provided as an example. Other examples may differ from what is described with regard to FIG. 5.

Figure 6:
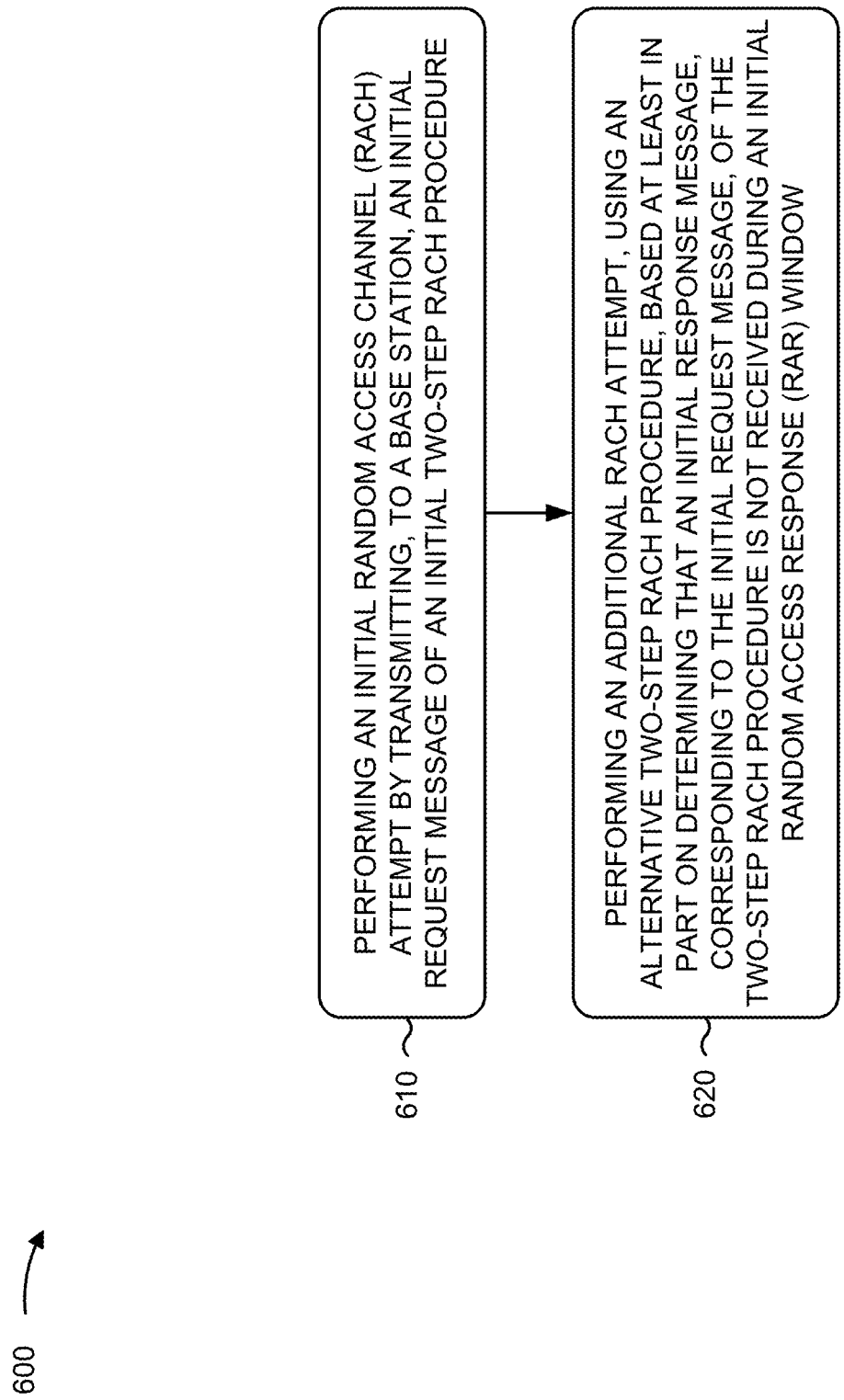
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with an alternative two-step RACH procedure.

As shown in FIG. 6, in some aspects, process 600 may include performing an initial RACH attempt by transmitting, to a base station, an initial request message of an initial two-step RACH procedure (block 610). For example, the UE (e.g., using transmit processor 264, controller/processor 280, memory 282, and/or the like) may perform an initial RACH attempt by transmitting, to a base station, an initial request message of an initial two-step RACH procedure, as described above.

As further shown in FIG. 6, in some aspects, process 600 may include performing an additional RACH attempt, using an alternative two-step RACH procedure, based at least in part on determining that an initial response message, corresponding to the initial request message, of the two-step RACH procedure is not received during an initial RAR window (block 620). For example, the UE (e.g., using receive processor 258, transmit processor 264, controller/processor 280, memory 282, and/or the like) may perform an additional RACH attempt, using an alternative two-step RACH procedure, based at least in part on determining that an initial response message, corresponding to the initial request message, of the two-step RACH procedure is not received during an initial RAR window, as described above.

Process 600 may include additional aspects, such as any single aspect or any combination of aspects described below and/or in connection with one or more other processes described elsewhere herein.

In a first aspect, process 600 includes obtaining one or more measurements associated with a signal, wherein the UE is to perform the additional RACH attempt based at least in part on the one or more measurements.

In a second aspect, alone or in combination with the first aspect, the one or more measurements comprise an SSB-based RSRP, and the UE is to perform the additional RACH attempt based at least in part on determining that the SSB-based RSRP satisfies a threshold.

In a third aspect, alone or in combination with one or more of the first and second aspects, transmitting the initial request message comprises transmitting an initial request message preamble according to an initial transmission procedure, and performing the alternative two-step RACH procedure comprises transmitting at least one additional request message preamble according to an additional transmission procedure, wherein the additional transmission procedure is different than the initial transmission procedure.

In a fourth aspect, alone or in combination with the third aspect, the additional transmission procedure comprises a coverage-enhanced transmission procedure.

In a fifth aspect, alone or in combination with one or more of the third through fourth aspects, the initial transmission procedure is performed using a first transmit power, and the additional transmission procedure is performed using a second transmit power that is higher than the first transmit power.

In a sixth aspect, alone or in combination with one or more of the third through fifth aspects, the initial transmission procedure is performed using a first subset of preamble sequences of a set of preamble sequences, and the additional transmission procedure is performed using a second subset of preamble sequences of the set of preamble sequences, wherein the second subset of preamble sequences is different than the first subset of preamble sequences.

In a seventh aspect, alone or in combination with one or more of the third through sixth aspects, the initial transmission procedure is performed using a first subset of ROs of a set of ROs, and the additional transmission procedure is performed using a second subset of ROs of the set of ROs, wherein the second subset of ROs is different than the first subset of ROs.

In an eighth aspect, alone or in combination with one or more of the third through seventh aspects, the initial transmission procedure is performed using an initial request message preamble format, and the additional transmission procedure is performed using at least one additional request message preamble format, wherein the at least one additional request message preamble format is different than the initial request message preamble format.

In a ninth aspect, alone or in combination with one or more of the third through eighth aspects, the additional transmission procedure is performed using a plurality of transmissions, wherein the plurality of transmissions correspond to a plurality of ROs.

In a tenth aspect, alone or in combination with the ninth aspect, each transmission of the plurality of transmissions is associated with a same SSB beam.

In an eleventh aspect, alone or in combination with one or more of the ninth through tenth aspects, the plurality of ROs comprise a plurality of groups of ROs, and each of the plurality of groups of ROs functions as a virtual RO corresponding to the at least one additional request message preamble.

In a twelfth aspect, alone or in combination with one or more of the third through eleventh aspects, the at least one additional request message preamble comprises a preamble sequence, and transmitting the at least one additional request message preamble comprises transmitting the preamble sequence in a plurality of transmissions.

In a thirteenth aspect, alone or in combination with one or more of the third through twelfth aspects, the at least one additional request message preamble comprises a plurality of preamble sequences, each preamble sequence of the plurality of preamble sequences is linked to each other preamble sequence of the plurality of sequences, and transmitting the at least one additional request message preamble comprises transmitting each of the plurality of preamble sequences in a respective one of a plurality of transmissions.

In a fourteenth aspect, alone or in combination with the thirteenth aspect, each preamble sequence of the plurality of preamble sequences is linked to each other preamble sequence of the plurality of sequences based at least in part on at least one of: a wireless communication standard, a configuration received from the base station, or a combination thereof.

In a fifteenth aspect, alone or in combination with one or more of the thirteenth through fourteenth aspects, the plurality of preamble sequences comprises a subset of a set of preamble sequences, and process 600 includes receiving, from the base station, a configuration of the subset of the set of preamble sequences.

In a sixteenth aspect, alone or in combination with the fifteenth aspect, the configuration of the subset of the set of preamble sequences is carried in RMSI.

In a seventeenth aspect, alone or in combination with one or more of the first through sixteenth aspects, transmitting the initial request message comprises transmitting the initial request message according to an initial mapping of an initial RO onto an initial set of PUSCH resources, and performing the alternative two-step RACH procedure comprises transmitting an additional request message according to an additional mapping of an additional RO onto an additional set of PUSCH resources.

In an eighteenth aspect, alone or in combination with the seventeenth aspect, transmitting the initial request message comprises transmitting an initial uplink RS using the initial set of PUSCH resources, and performing the alternative two-step RACH procedure comprises transmitting an additional uplink RS using the additional set of PUSCH resources, wherein the additional uplink RS is to facilitate beam refinement associated with the base station.

In a nineteenth aspect, alone or in combination with one or more of the first through eighteenth aspects, transmitting the initial request message comprises transmitting the initial request message according to an initial mapping of an initial RO to an initial set of PUSCH resources, and performing the alternative two-step RACH procedure comprises transmitting a plurality of additional request messages according to an additional mapping of a plurality of additional ROs to a plurality of additional sets of PUSCH resources.

In a twentieth aspect, alone or in combination with the nineteenth aspect, the additional mapping comprises a mapping of four additional ROs to two sets of additional PUSCH resources.

In a twenty-first aspect, alone or in combination with one or more of the nineteenth through twentieth aspects, process 600 includes receiving an indication of a time domain offset between at least one of the plurality of additional ROs and at least one of the plurality of additional sets of PUSCH resources to which the at least one of the plurality of additional ROs is mapped.

In a twenty-second aspect, alone or in combination with the twenty-first aspect, the at least one of the plurality of additional ROs comprises a first RO, of the plurality of additional ROs, to occur.

In a twenty-third aspect, alone or in combination with the twenty-first aspect, the at least one of the plurality of additional ROs further comprises a third RO, of the plurality of additional ROs, to occur.

In a twenty-fourth aspect, alone or in combination with one or more of the twenty-first through twenty-third aspects, the time domain offset comprises a slot offset.

In a twenty-fifth aspect, alone or in combination with one or more of the nineteenth through twenty-fourth aspects, process 600 includes receiving an indication of a frequency domain offset between at least one of the plurality of additional ROs and at least one of the plurality of additional sets of PUSCH resources to which the at least one of the plurality of additional ROs is mapped.

In a twenty-sixth aspect, alone or in combination with the twenty-fifth aspect, the at least one of the plurality of additional ROs comprises a first RO, of the plurality of additional ROs, to occur.

In a twenty-seventh aspect, alone or in combination with the twenty-fifth aspect, the at least one of the plurality of additional ROs further comprises a third RO, of the plurality of additional ROs, to occur.

In a twenty-eighth aspect, alone or in combination with one or more of the twenty-fifth through twenty-seventh aspects, the frequency domain offset comprises a subcarrier offset.

In a twenty-ninth aspect, alone or in combination with one or more of the first through twenty-eighth aspects, performing the initial two-step RACH procedure comprises monitoring, according to an initial reception procedure, an initial PDCCH for the initial response message, and performing the alternative two-step RACH procedure comprises monitoring, according to an additional reception procedure, an additional PDCCH for an additional response message that corresponds to an additional request message, wherein the additional reception procedure is different than the initial reception procedure.

In a thirtieth aspect, alone or in combination with the twenty-ninth aspect, the additional reception procedure comprises a coverage-enhanced reception procedure.

In a thirty-first aspect, alone or in combination with one or more of the twenty-ninth through thirtieth aspects, the additional reception procedure comprises monitoring a plurality of PDCCH monitoring candidates associated with a plurality of monitoring occasions.

In a thirty-second aspect, alone or in combination with the thirty-first aspect, each of the plurality of monitoring occasions comprises the additional response message.

In a thirty-third aspect, alone or in combination with one or more of the thirty-first through thirty-second aspects, each of the plurality of PDCCH monitoring candidates indicates at least one of: an index associated with the additional response message, a particular location in a search space corresponding to each monitoring occasion associated with the PDCCH monitoring candidate, or a combination thereof.

In a thirty-fourth aspect, alone or in combination with the thirty-third aspect, the plurality of PDCCH monitoring candidates are associated with a plurality of slots.

In a thirty-fifth aspect, alone or in combination with one or more of the thirty-first through thirty-fourth aspects, process 600 includes soft combining the plurality of PDCCH monitoring candidates to generate a combined PDCCH monitoring candidate; decoding the combined PDCCH monitoring candidate; and evaluating a CRC associated with the combined PDCCH monitoring candidate to determine that the combined PDCCH monitoring candidate comprises the additional response message.

In a thirty-sixth aspect, alone or in combination with one or more of the thirty-first through thirty-fifth aspects, the plurality of monitoring occasions comprise a plurality of groups of monitoring occasions, each of the plurality of groups of monitoring occasions comprising a plurality of consecutive monitoring occasions corresponding to a plurality of slots having an associated plurality of CORESETs.

In a thirty-seventh aspect, alone or in combination with the thirty-sixth aspect, the plurality of CORESETs function as a virtual monitoring occasion corresponding to the additional response message.

In a thirty-eighth aspect, alone or in combination with one or more of the first through thirty-seventh aspects, performing the initial two-step RACH procedure comprises monitoring, during the initial RAR window, for the initial response message, and performing the alternative two-step RACH procedure comprises monitoring, during an additional RAR window, for an additional response message that corresponds to an additional request message, wherein the additional RAR window is different than the initial RAR window.

In a thirty-ninth aspect, alone or in combination with the thirty-eighth aspect, the initial RAR window has a first length and the additional RAR window has a second length that is different than the first length.

In a fortieth aspect, alone or in combination with the thirty-ninth aspect, process 600 includes receiving, in RMSI, a configuration of the first length and the second length.

In a forty-first aspect, alone or in combination with the thirty-eighth aspect, a length of the initial RAR window is a same length as a length of the additional RAR window.

In a forty-second aspect, alone or in combination with one or more of the thirty-eighth through forty-first aspects, the initial two-step RACH procedure comprises an initial offset between transmitting the initial request message and a starting time of the initial RAR window, and the alternative two-step RACH procedure comprises an additional offset between transmission of an additional request message and a starting time of the additional RAR window, wherein the additional offset is different than the initial offset.

In a forty-third aspect, alone or in combination with one or more of the first through forty-second aspects, process 600 includes obtaining one or more measurements associated with a signal, wherein a length of the initial RAR window is based at least in part on the one or more measurements.

In a forty-fourth aspect, alone or in combination with the forty-third aspect, the one or more measurements comprise an SSB-based RSRP, and the length of the initial RAR window is shorter than a length of an additional RAR window based at least in part on determining that the SSB-based RSRP satisfies a threshold.

In a forty-fifth aspect, alone or in combination with one or more of the first through forty-fourth aspects, the initial two-step RACH procedure comprises an initial DCI carried by the initial response message, the initial DCI having a first size, and the alternative two-step RACH procedure comprises an additional DCI carried by an additional response message, wherein the additional DCI has a second size that is different than the first size.

In a forty-sixth aspect, alone or in combination with one or more of the first through forty-fifth aspects, the initial two-step RACH procedure comprises an initial DCI carried by the initial response message, the initial DCI comprising content associated with a first interpretation by the UE, and the alternative two-step RACH procedure comprises an additional DCI carried by an additional response message, the additional DCI comprising content associated with a second interpretation by the UE, wherein the second interpretation is different than the first interpretation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
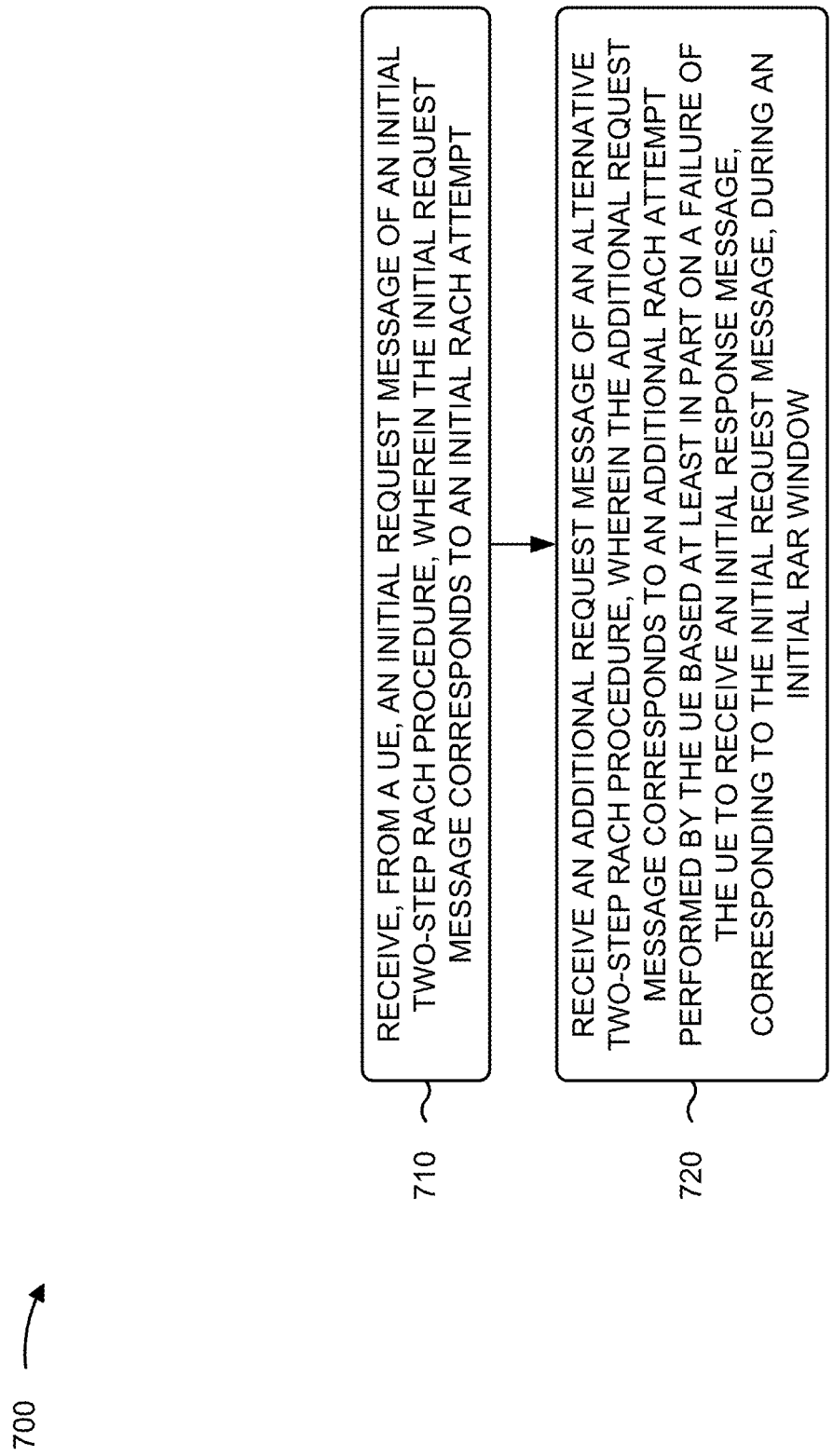
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with an alternative two-step RACH procedure.

As shown in FIG. 7, in some aspects, process 700 may include receiving, from a UE, an initial request message of an initial two-step RACH procedure, wherein the initial request message corresponds to an initial RACH attempt (block 710). For example, the base station (e.g., using receive processor 238, controller/processor 240, memory 242, and/or the like) may receive, from a UE, an initial request message of an initial two-step RACH procedure, as described above. In some aspects, the initial request message corresponds to an initial RACH attempt.

As further shown in FIG. 7, in some aspects, process 700 may include receiving an additional request message of an alternative two-step RACH procedure, wherein the additional request message corresponds to an additional RACH attempt performed by the UE based at least in part on a failure of the UE to receive an initial response message, corresponding to the initial request message, during an initial RAR window (block 720). For example, the base station (e.g., using receive processor 238, controller/processor 240, memory 242, and/or the like) may receive an additional request message of an alternative two-step RACH procedure, as described above. In some aspects, the additional request message corresponds to an additional RACH attempt performed by the UE based at least in part on a failure of the UE to receive an initial response message, corresponding to the initial request message, during an initial RAR window.

Process 700 may include additional aspects, such as any single aspect or any combination of aspects described below and/or in connection with one or more other processes described elsewhere herein.

In a first aspect, the additional RACH attempt is performed based at least in part on one or more measurements associated with a signal.

In a second aspect, alone or in combination with the first aspect, the one or more measurements comprise an SSB-based RSRP, and the additional RACH attempt is performed based at least in part on the SSB-based RSRP satisfying a threshold.

In a third aspect, alone or in combination with one or more of the first and second aspects, receiving the initial request message comprises receiving an initial request message preamble transmitted according to an initial transmission procedure, and process 700 includes receiving at least one additional request message preamble according to an additional transmission procedure that is different than the initial transmission procedure, wherein the at least one additional request message preamble corresponds to the alternative two-step RACH procedure.

In a fourth aspect, alone or in combination with the third aspect, the additional transmission procedure comprises a coverage-enhanced transmission procedure.

In a fifth aspect, alone or in combination with one or more of the third through fourth aspects, the initial transmission procedure is performed using a first transmit power, and the additional transmission procedure is performed using a second transmit power that is higher than the first transmit power.

In a sixth aspect, alone or in combination with one or more of the third through fifth aspects, the initial transmission procedure is performed using a first subset of preamble sequences of a set of preamble sequences, and the additional transmission procedure is performed using a second subset of preamble sequences of the set of preamble sequences, wherein the second subset of preamble sequences is different than the first subset of preamble sequences.

In a seventh aspect, alone or in combination with one or more of the third through sixth aspects, the initial transmission procedure is performed using a first subset of ROs of a set of ROs, and the additional transmission procedure is performed using a second subset of ROs of the set of ROs, wherein the second subset of ROs is different than the first subset of ROs.

In an eighth aspect, alone or in combination with one or more of the third through seventh aspects, the initial transmission procedure is performed using an initial request message preamble format, and the additional transmission procedure is performed using at least one additional request message preamble format, wherein the at least one additional request message preamble format is different than the initial request message preamble format.

In a ninth aspect, alone or in combination with one or more of the third through eighth aspects, the additional transmission procedure is performed using a plurality of transmissions, wherein the plurality of transmissions correspond to a plurality of ROs.

In a tenth aspect, alone or in combination with the ninth aspect, each transmission of the plurality of transmissions is associated with a same SSB beam.

In an eleventh aspect, alone or in combination with one or more of the ninth through tenth aspects, the plurality of ROs comprise a plurality of groups of ROs, wherein each of the plurality of groups of ROs functions as a virtual RO corresponding to the at least one additional request message preamble.

In a twelfth aspect, alone or in combination with one or more of the third through eleventh aspects, the at least one additional request message preamble comprises a preamble sequence, and receiving the at least one additional request message preamble comprises receiving the preamble sequence in a plurality of transmissions.

In a thirteenth aspect, alone or in combination with one or more of the third through twelfth aspects, the at least one additional request message preamble comprises a plurality of preamble sequences, each preamble sequence of the plurality of preamble sequences is linked to each other preamble sequence of the plurality of sequences, and receiving the at least one additional request message preamble comprises receiving each of the plurality of preamble sequences in a respective one of a plurality of transmissions.

In a fourteenth aspect, alone or in combination with the thirteenth aspect, each preamble sequence of the plurality of preamble sequences is linked to each other preamble sequence of the plurality of sequences based at least in part on at least one of: a wireless communication standard, a configuration transmitted to the UE, or a combination thereof.

In a fifteenth aspect, alone or in combination with one or more of the thirteenth through fourteenth aspects, the plurality of preamble sequences comprises a subset of a set of preamble sequences, and process 700 includes transmitting, to the UE, a configuration of the subset of the set of preamble sequences.

In a sixteenth aspect, alone or in combination with the fifteenth aspect, the configuration of the subset of the set of preamble sequences is carried in RMSI.

In a seventeenth aspect, alone or in combination with one or more of the first through sixteenth aspects, the initial request message comprises an initial mapping of an initial RO onto an initial set of PUSCH resources, and process 700 includes receiving an additional request message according to an additional mapping of an additional RO onto an additional set of PUSCH resources, wherein the additional request message corresponds to the alternative two-step RACH procedure.

In an eighteenth aspect, alone or in combination with the seventeenth aspect, receiving the initial request message comprises receiving an initial uplink RS using the initial set of PUSCH resources, and process 700 includes receiving an additional uplink RS using the additional set of PUSCH resources, wherein the additional uplink RS is to facilitate beam refinement associated with the base station, and wherein the additional uplink RS corresponds to the alternative two-step RACH procedure.

In a nineteenth aspect, alone or in combination with one or more of the first through eighteenth aspects, receiving the initial request message comprises receiving the initial request message according to an initial mapping of an initial RO to an initial set of PUSCH resources, and process 700 includes receiving a plurality of additional request messages according to an additional mapping of a plurality of additional ROs to a plurality of additional sets of PUSCH resources, wherein the plurality of additional request messages correspond to the alternative two-step RACH procedure.

In a twentieth aspect, alone or in combination with the nineteenth aspect, the additional mapping comprises a mapping of four additional ROs to two sets of additional PUSCH resources.

In a twenty-first aspect, alone or in combination with one or more of the nineteenth through twentieth aspects, process 700 includes transmitting an indication of a time domain offset between at least one of the plurality of additional ROs and at least one of the plurality of additional sets of PUSCH resources to which the at least one of the plurality of additional ROs is mapped.

In a twenty-second aspect, alone or in combination with the twenty-first aspect, the at least one of the plurality of additional ROs comprises a first RO, of the plurality of additional ROs, to occur.

In a twenty-third aspect, alone or in combination with the twenty-first aspect, the at least one of the plurality of additional ROs further comprises a third RO, of the plurality of additional ROs, to occur.

In a twenty-fourth aspect, alone or in combination with one or more of the twenty-first through twenty-third aspects, the time domain offset comprises a slot offset.

In a twenty-fifth aspect, alone or in combination with one or more of the nineteenth through twenty-fourth aspects, process 700 includes transmitting an indication of a frequency domain offset between at least one of the plurality of additional ROs and at least one of the plurality of additional sets of PUSCH resources to which the at least one of the plurality of additional ROs is mapped.

In a twenty-sixth aspect, alone or in combination with the twenty-fifth aspect, the at least one of the plurality of additional ROs comprises a first RO, of the plurality of additional ROs, to occur.

In a twenty-seventh aspect, alone or in combination with the twenty-fifth aspect, the at least one of the plurality of additional ROs further comprises a third RO, of the plurality of additional ROs, to occur.

In a twenty-eighth aspect, alone or in combination with one or more of the twenty-fifth through twenty-seventh aspects, the frequency domain offset comprises a subcarrier offset.

In a twenty-ninth aspect, alone or in combination with one or more of the first through twenty-eighth aspects, process 700 includes transmitting an additional response message that corresponds to the additional request message of the alternative two-step RACH procedure.

In a thirtieth aspect, alone or in combination with the twenty-ninth aspect, the additional response message is transmitted using a plurality of monitoring occasions corresponding to a plurality of PDCCH monitoring candidates.

In a thirty-first aspect, alone or in combination with the thirtieth aspect, each of the plurality of monitoring occasions comprises the additional response message.

In a thirty-second aspect, alone or in combination with one or more of the twenty-ninth through thirty-first aspects, each of the plurality of PDCCH monitoring candidates indicates at least one of: an index associated with the additional response message, a particular location in a search space corresponding to each monitoring occasion associated with the PDCCH monitoring candidate, or a combination thereof.

In a thirty-third aspect, alone or in combination with one or more of the thirtieth through thirty-second aspects, the plurality of PDCCH monitoring candidates are associated with a plurality of slots.

In a thirty-fourth aspect, alone or in combination with one or more of the thirtieth through thirty-third aspects, the plurality of monitoring occasions comprise a plurality of groups of monitoring occasions, each of the plurality of groups of monitoring occasions comprising a plurality of consecutive monitoring occasions corresponding to a plurality of slots having an associated plurality of CORESETs.

In a thirty-fifth aspect, alone or in combination with the thirty-fourth aspect, the plurality of CORESETs function as a virtual monitoring occasion corresponding to the additional response message.

In a thirty-sixth aspect, alone or in combination with one or more of the first through thirty-fifth aspects, the alternative two-step RACH procedure comprises an additional RAR window that is different than the initial RAR window.

In a thirty-seventh aspect, alone or in combination with one or more of the first through thirty-sixth aspects, the initial RAR window has a first length, and the additional RAR window has a second length that is different than the first length.

In a thirty-eighth aspect, alone or in combination with the thirty-seventh aspect, process 700 includes transmitting, in RMSI, a configuration of the first length and the second length.

In a thirty-ninth aspect, alone or in combination with the thirty-seventh aspect, a length of the initial RAR window is a same length as a length of the additional RAR window.

In a fortieth aspect, alone or in combination with one or more of the thirty-seventh through thirty-ninth aspects, the initial two-step RACH procedure comprises an initial offset between transmission of the initial request message and a starting time of the initial RAR window, and the alternative two-step RACH procedure comprises an additional offset between transmission of the additional request message and a starting time of the additional RAR window, wherein the additional offset is different than the initial offset.

In a forty-first aspect, alone or in combination with one or more of the first through fortieth aspects, a length of the initial RAR window is based at least in part on one or more measurements associated with a signal.

In a forty-second aspect, alone or in combination with the forty-first aspect, the one or more measurements comprise an SSB-based RSRP, and the length of the initial RAR window is shorter than a length of an additional RAR window based at least in part the SSB-based RSRP satisfying a threshold.

In a forty-third aspect, alone or in combination with one or more of the first through forty-second aspects, the initial two-step RACH procedure comprises an initial DCI carried by the initial response message, the initial DCI having a first size, and the alternative two-step RACH procedure comprises an additional DCI carried by an additional response message, wherein the additional DCI has a second size that is different than the first size.

In a forty-fourth aspect, alone or in combination with one or more of the first through forty-third aspects, the initial two-step RACH procedure comprises an initial DCI carried by the initial response message, the initial DCI comprising content associated with a first interpretation by the UE, and the alternative two-step RACH procedure comprises an additional DCI carried by an additional response message, the additional DCI comprising content associated with a second interpretation by the UE, wherein the second interpretation is different than the first interpretation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a user equipment (UE), comprising: performing an initial random access channel (RACH) attempt by transmitting, to a base station, an initial request message of an initial two-step RACH procedure; and performing an additional RACH attempt, using an alternative two-step RACH procedure, based at least in part on determining that an initial response message, corresponding to the initial request message, of the two-step RACH procedure is not received during an initial random access response (RAR) window.

Aspect 2: The method of Aspect 1, further comprising: obtaining one or more measurements associated with a signal, wherein the UE is to perform the additional RACH attempt based at least in part on the one or more measurements.

Aspect 3: The method of Aspect 2, wherein the one or more measurements comprise a synchronization signal block (SSB)-based reference signal received power (RSRP), and wherein the UE is to perform the additional RACH attempt based at least in part on determining that the SSB-based RSRP satisfies a threshold.

Aspect 4: The method of any of Aspects 1-3, wherein transmitting the initial request message comprises transmitting an initial request message preamble according to an initial transmission procedure, and wherein performing the alternative two-step RACH procedure comprises transmitting at least one additional request message preamble according to an additional transmission procedure, wherein the additional transmission procedure is different than the initial transmission procedure.

Aspect 5: The method of Aspect 4, wherein the additional transmission procedure comprises a coverage-enhanced transmission procedure.

Aspect 6: The method of either of Aspects 4 or 5, wherein the initial transmission procedure is performed using a first transmit power, and wherein the additional transmission procedure is performed using a second transmit power that is higher than the first transmit power.

Aspect 7: The method of any of Aspects 4-6, wherein the initial transmission procedure is performed using a first subset of preamble sequences of a set of preamble sequences, and wherein the additional transmission procedure is performed using a second subset of preamble sequences of the set of preamble sequences, wherein the second subset of preamble sequences is different than the first subset of preamble sequences.

Aspect 8: The method of any of Aspects 4-7, wherein the initial transmission procedure is performed using a first subset of RACH occasions (ROs) of a set of ROs, and wherein the additional transmission procedure is performed using a second subset of ROs of the set of ROs, wherein the second subset of ROs is different than the first subset of ROs.

Aspect 9: The method of any of Aspects 4-8, wherein the initial transmission procedure is performed using an initial request message preamble format, and wherein the additional transmission procedure is performed using at least one additional request message preamble format, wherein the at least one additional request message preamble format is different than the initial request message preamble format.

Aspect 10: The method of any of Aspects 4-9, wherein the additional transmission procedure is performed using a plurality of transmissions, wherein the plurality of transmissions correspond to a plurality of RACH occasions (ROs).

Aspect 11: The method of Aspect 10, wherein each transmission of the plurality of transmissions is associated with a same synchronization signal block beam.

Aspect 12: The method of either of Aspects 10 or 11, wherein the plurality of ROs comprise a plurality of groups of ROs, wherein each of the plurality of groups of ROs functions as a virtual RO corresponding to the at least one additional request message preamble.

Aspect 13: The method of any of Aspects 4-12, wherein the at least one additional request message preamble comprises a preamble sequence, and wherein transmitting the at least one additional request message preamble comprises transmitting the preamble sequence in a plurality of transmissions.

Aspect 14: The method of any of Aspects 4-13, wherein the at least one additional request message preamble comprises a plurality of preamble sequences, wherein each preamble sequence of the plurality of preamble sequences is linked to each other preamble sequence of the plurality of sequences, and wherein transmitting the at least one additional request message preamble comprises transmitting each of the plurality of preamble sequences in a respective one of a plurality of transmissions.

Aspect 15: The method of Aspect 14, wherein each preamble sequence of the plurality of preamble sequences is linked to each other preamble sequence of the plurality of sequences based at least in part on at least one of: a wireless communication standard, a configuration received from the base station, or a combination thereof.

Aspect 16: The method of either of Aspects 14 or 15, wherein the plurality of preamble sequences comprises a subset of a set of preamble sequences, the method further comprising receiving, from the base station, a configuration of the subset of the set of preamble sequences.

Aspect 17: The method of Aspect 16, wherein the configuration of the subset of the set of preamble sequences is carried in remaining minimum system information.

Aspect 18: The method of any of Aspects 1-17, wherein transmitting the initial request message comprises transmitting the initial request message according to an initial mapping of an initial RACH occasion (RO) onto an initial set of physical uplink shared channel (PUSCH) resources, and wherein performing the alternative two-step RACH procedure comprises transmitting an additional request message according to an additional mapping of an additional RO onto an additional set of PUSCH resources.

Aspect 19: The method of Aspect 18, wherein transmitting the initial request message comprises transmitting an initial uplink reference signal (RS) using the initial set of PUSCH resources, and wherein performing the alternative two-step RACH procedure comprises transmitting an additional uplink RS using the additional set of PUSCH resources, wherein the additional uplink RS is to facilitate beam refinement associated with the base station.

Aspect 20: The method of any of Aspects 1-19, wherein transmitting the initial request message comprises transmitting the initial request message according to an initial mapping of an initial RACH occasion (RO) to an initial set of physical uplink shared channel (PUSCH) resources, and wherein performing the alternative two-step RACH procedure comprises transmitting a plurality of additional request messages according to an additional mapping of a plurality of additional ROs to a plurality of additional sets of PUSCH resources.

Aspect 21: The method of Aspect 20, wherein the additional mapping comprises a mapping of four additional ROs to two sets of additional PUSCH resources.

Aspect 22: The method of either of Aspects 20 or 21, further comprising receiving an indication of a time domain offset between at least one of the plurality of additional ROs and at least one of the plurality of additional sets of PUSCH resources to which the at least one of the plurality of additional ROs is mapped.

Aspect 23: The method of Aspect 22, wherein the at least one of the plurality of additional ROs comprises a first RO, of the plurality of additional ROs, to occur.

Aspect 24: The method of Aspect 22, wherein the at least one of the plurality of additional ROs further comprises a third RO, of the plurality of additional ROs, to occur.

Aspect 25: The method of any of Aspects 22-24, wherein the time domain offset comprises a slot offset.

Aspect 26: The method of any of Aspects 20-25, further comprising receiving an indication of a frequency domain offset between at least one of the plurality of additional ROs and at least one of the plurality of additional sets of PUSCH resources to which the at least one of the plurality of additional ROs is mapped.

Aspect 27: The method of Aspect 26, wherein the at least one of the plurality of additional ROs comprises a first RO, of the plurality of additional ROs, to occur.

Aspect 28: The method of Aspect 26, wherein the at least one of the plurality of additional ROs further comprises a third RO, of the plurality of additional ROs, to occur.

Aspect 29: The method of any of Aspects 26-28, wherein the frequency domain offset comprises a subcarrier offset.

Aspect 30: The method of any of Aspects 1-29, wherein performing the initial two-step RACH procedure comprises monitoring, according to an initial reception procedure, an initial physical downlink control channel (PDCCH) for the initial response message; and wherein performing the alternative two-step RACH procedure comprises monitoring, according to an additional reception procedure, an additional PDCCH for an additional response message that corresponds to an additional request message, wherein the additional reception procedure is different than the initial reception procedure.

Aspect 31: The method of Aspect 30, wherein the additional reception procedure comprises a coverage-enhanced reception procedure.

Aspect 32: The method of either of Aspects 30 or 31, wherein the additional reception procedure comprises monitoring a plurality of PDCCH monitoring candidates associated with a plurality of monitoring occasions.

Aspect 33: The method of Aspect 32, wherein each of the plurality of monitoring occasions comprises the additional response message.

Aspect 34: The method of either of Aspects 32 or 33, wherein each of the plurality of PDCCH monitoring candidates indicates at least one of: an index associated with the additional response message, a particular location in a search space corresponding to each monitoring occasion associated with the PDCCH monitoring candidate, or a combination thereof.

Aspect 35: The method of Aspect 34, wherein the plurality of PDCCH monitoring candidates are associated with a plurality of slots.

Aspect 36: The method of any of Aspects 32-35, further comprising: soft combining the plurality of PDCCH monitoring candidates to generate a combined PDCCH monitoring candidate; decoding the combined PDCCH monitoring candidate; and evaluating a cyclic redundancy check associated with the combined PDCCH monitoring candidate to determine that the combined PDCCH monitoring candidate comprises the additional response message.

Aspect 37: The method of any of Aspects 32-36, wherein the plurality of monitoring occasions comprise a plurality of groups of monitoring occasions, each of the plurality of groups of monitoring occasions comprising a plurality of consecutive monitoring occasions corresponding to a plurality of slots having an associated plurality of control resource sets (CORESETs).

Aspect 38: The method of Aspect 37, wherein the plurality of CORESETs function as a virtual monitoring occasion corresponding to the additional response message.

Aspect 39: The method of any of Aspects 1-38, wherein performing the initial two-step RACH procedure comprises monitoring, during the initial RAR window, for the initial response message; and wherein performing the alternative two-step RACH procedure comprises monitoring, during an additional RAR window, for an additional response message that corresponds to an additional request message, wherein the additional RAR window is different than the initial RAR window.

Aspect 40: The method of Aspect 39, wherein the initial RAR window has a first length, and wherein the additional RAR window has a second length that is different than the first length.

Aspect 41: The method of Aspect 40, further comprising receiving, in remaining minimum system information, a configuration of the first length and the second length.

Aspect 42: The method of Aspect 39, wherein a length of the initial RAR window is a same length as a length of the additional RAR window.

Aspect 43: The method of any of Aspects 39-42, wherein the initial two-step RACH procedure comprises an initial offset between transmitting the initial request message and a starting time of the initial RAR window; and wherein the alternative two-step RACH procedure comprises an additional offset between transmission of an additional request message and a starting time of the additional RAR window, wherein the additional offset is different than the initial offset.

Aspect 44: The method of any of Aspects 1-43, further comprising: obtaining one or more measurements associated with a signal, wherein a length of the initial RAR window is based at least in part on the one or more measurements.

Aspect 45: The method of Aspect 44, wherein the one or more measurements comprise a synchronization signal block (SSB)-based reference signal received power (RSRP), and wherein the length of the initial RAR window is shorter than a length of an additional RAR window based at least in part on determining that the SSB-based RSRP satisfies a threshold.

Aspect 46: The method of any of Aspects 1-45, wherein the initial two-step RACH procedure comprises an initial downlink control information (DCI) carried by the initial response message, the initial DCI having a first size; and wherein the alternative two-step RACH procedure comprises an additional DCI carried by an additional response message, wherein the additional DCI has a second size that is different than the first size.

Aspect 47: The method of any of Aspects 1-46, wherein the initial two-step RACH procedure comprises an initial downlink control information (DCI) carried by the initial response message, the initial DCI comprising content associated with a first interpretation by the UE; and wherein the alternative two-step RACH procedure comprises an additional DCI carried by an additional response message, the additional DCI comprising content associated with a second interpretation by the UE, wherein the second interpretation is different than the first interpretation.

Aspect 48: A method of wireless communication performed by a base station, comprising: receiving, from a user equipment (UE), an initial request message of an initial two-step random access channel (RACH) procedure, wherein the initial request message corresponds to an initial RACH attempt; and receiving an additional request message of an alternative two-step RACH procedure, wherein the additional request message corresponds to an additional RACH attempt performed by the UE based at least in part on a failure of the UE to receive an initial response message, corresponding to the initial request message, during an initial random access response (RAR) window.

Aspect 49: The method of Aspect 48, wherein the additional RACH attempt is performed based at least in part on one or more measurements associated with a signal.

Aspect 50: The method of Aspect 49, wherein the one or more measurements comprise a synchronization signal block (SSB)-based reference signal received power (RSRP), and wherein the additional RACH attempt is performed based at least in part on the SSB-based RSRP satisfying a threshold.

Aspect 51: The method of any of Aspects 48-50, wherein receiving the initial request message comprises receiving an initial request message preamble transmitted according to an initial transmission procedure, and wherein the method further comprises receiving at least one additional request message preamble according to an additional transmission procedure that is different than the initial transmission procedure, wherein the at least one additional request message preamble corresponds to the alternative two-step RACH procedure.

Aspect 52: The method of Aspect 51, wherein the additional transmission procedure comprises a coverage-enhanced transmission procedure.

Aspect 53: The method of either of Aspects 51 or 52, wherein the initial transmission procedure is performed using a first transmit power, and wherein the additional transmission procedure is performed using a second transmit power that is higher than the first transmit power.

Aspect 54: The method of any of Aspects 51-53, wherein the initial transmission procedure is performed using a first subset of preamble sequences of a set of preamble sequences, and wherein the additional transmission procedure is performed using a second subset of preamble sequences of the set of preamble sequences, wherein the second subset of preamble sequences is different than the first subset of preamble sequences.

Aspect 55: The method of any of Aspects 51-54, wherein the initial transmission procedure is performed using a first subset of RACH occasions (ROs) of a set of ROs, and wherein the additional transmission procedure is performed using a second subset of ROs of the set of ROs, wherein the second subset of ROs is different than the first subset of ROs.

Aspect 56: The method of any of Aspects 51-55, wherein the initial transmission procedure is performed using an initial request message preamble format, and wherein the additional transmission procedure is performed using at least one additional request message preamble format, wherein the at least one additional request message preamble format is different than the initial request message preamble format.

Aspect 57: The method of any of Aspects 51-56, wherein the additional transmission procedure is performed using a plurality of transmissions, wherein the plurality of transmissions correspond to a plurality of RACH occasions (ROs).

Aspect 58: The method of Aspect 57, wherein each transmission of the plurality of transmissions is associated with a same synchronization signal block beam.

Aspect 59: The method of either of Aspects 57 or 58, wherein the plurality of ROs comprise a plurality of groups of ROs, wherein each of the plurality of groups of ROs functions as a virtual RO corresponding to the at least one additional request message preamble.

Aspect 60: The method of any of Aspects 51-59, wherein the at least one additional request message preamble comprises a preamble sequence, and wherein receiving the at least one additional request message preamble comprises receiving the preamble sequence in a plurality of transmissions.

Aspect 61: The method of any of Aspects 51-60, wherein the at least one additional request message preamble comprises a plurality of preamble sequences, wherein each preamble sequence of the plurality of preamble sequences is linked to each other preamble sequence of the plurality of sequences, and wherein receiving the at least one additional request message preamble comprises receiving each of the plurality of preamble sequences in a respective one of a plurality of transmissions.

Aspect 62: The method of Aspect 61, wherein each preamble sequence of the plurality of preamble sequences is linked to each other preamble sequence of the plurality of sequences based at least in part on at least one of: a wireless communication standard, a configuration transmitted to the UE, or a combination thereof.

Aspect 63: The method of either of Aspects 61 or 62, wherein the plurality of preamble sequences comprises a subset of a set of preamble sequences, the method further comprising transmitting, to the UE, a configuration of the subset of the set of preamble sequences.

Aspect 64: The method of Aspect 63, wherein the configuration of the subset of the set of preamble sequences is carried in remaining minimum system information.

Aspect 65: The method of any of Aspects 48-64, wherein the initial request message comprises an initial mapping of an initial RACH occasion (RO) onto an initial set of physical uplink shared channel (PUSCH) resources, and wherein the method further comprises receiving an additional request message according to an additional mapping of an additional RO onto an additional set of PUSCH resources, wherein the additional request message corresponds to the alternative two-step RACH procedure.

Aspect 66: The method of Aspect 65, wherein receiving the initial request message comprises receiving an initial uplink reference signal (RS) using the initial set of PUSCH resources, and wherein the method further comprises receiving an additional uplink RS using the additional set of PUSCH resources, wherein the additional uplink RS is to facilitate beam refinement associated with the base station, and wherein the additional uplink RS corresponds to the alternative two-step RACH procedure.

Aspect 67: The method of any of Aspects 48-66, wherein receiving the initial request message comprises receiving the initial request message according to an initial mapping of an initial RACH occasion (RO) to an initial set of physical uplink shared channel (PUSCH) resources, and wherein the method further comprises receiving a plurality of additional request messages according to an additional mapping of a plurality of additional ROs to a plurality of additional sets of PUSCH resources, wherein the plurality of additional request messages correspond to the alternative two-step RACH procedure.

Aspect 68: The method of Aspect 67, wherein the additional mapping comprises a mapping of four additional ROs to two sets of additional PUSCH resources.

Aspect 69: The method of either of Aspects 67 or 68, further comprising transmitting an indication of a time domain offset between at least one of the plurality of additional ROs and at least one of the plurality of additional sets of PUSCH resources to which the at least one of the plurality of additional ROs is mapped.

Aspect 70: The method of Aspect 69, wherein the at least one of the plurality of additional ROs comprises a first RO, of the plurality of additional ROs, to occur.

Aspect 71: The method of Aspect 69, wherein the at least one of the plurality of additional ROs further comprises a third RO, of the plurality of additional ROs, to occur.

Aspect 72: The method of any of Aspects 69-71, wherein the time domain offset comprises a slot offset.

Aspect 73: The method of any of Aspects 67-72, further comprising transmitting an indication of a frequency domain offset between at least one of the plurality of additional ROs and at least one of the plurality of additional sets of PUSCH resources to which the at least one of the plurality of additional ROs is mapped.

Aspect 74: The method of Aspect 73, wherein the at least one of the plurality of additional ROs comprises a first RO, of the plurality of additional ROs, to occur.

Aspect 75: The method of Aspect 73, wherein the at least one of the plurality of additional ROs further comprises a third RO, of the plurality of additional ROs, to occur.

Aspect 76: The method of any of Aspects 73-75, wherein the frequency domain offset comprises a subcarrier offset.

Aspect 77: The method of any of Aspects 48-76, further comprising: transmitting an additional response message that corresponds to the additional request message of the alternative two-step RACH procedure.

Aspect 78: The method of Aspect 77, wherein the additional response message is transmitted using a plurality of monitoring occasions corresponding to a plurality of physical downlink control channel (PDCCH) monitoring candidates.

Aspect 79: The method of Aspect 78, wherein each of the plurality of monitoring occasions comprises the additional response message.

Aspect 80: The method of either of Aspects 78 or 79, wherein each of the plurality of PDCCH monitoring candidates indicates at least one of: an index associated with the additional response message, a particular location in a search space corresponding to each monitoring occasion associated with a respective PDCCH monitoring candidate, or a combination thereof.

Aspect 81: The method of any of Aspects 78-80, wherein the plurality of PDCCH monitoring candidates are associated with a plurality of slots.

Aspect 82: The method of any of Aspects 78-81, wherein the plurality of monitoring occasions comprise a plurality of groups of monitoring occasions, each of the plurality of groups of monitoring occasions comprising a plurality of consecutive monitoring occasions corresponding to a plurality of slots having an associated plurality of control resource sets (CORESETs).

Aspect 83: The method of Aspect 82, wherein the plurality of CORESETs function as a virtual monitoring occasion corresponding to the additional response message.

Aspect 84: The method of any of Aspects 48-83, wherein the alternative two-step RACH procedure comprises an additional RAR window that is different than the initial RAR window.

Aspect 85: The method of any of Aspects 48-84, wherein the initial RAR window has a first length, and wherein the additional RAR window has a second length that is different than the first length.

Aspect 86: The method of Aspect 85, further comprising transmitting, in remaining minimum system information, a configuration of the first length and the second length.

Aspect 87: The method of Aspect 84, wherein a length of the initial RAR window is a same length as a length of the additional RAR window.

Aspect 88: The method of any of Aspects 84-87, wherein the initial two-step RACH procedure comprises an initial offset between transmission of the initial request message and a starting time of the initial RAR window; and wherein the alternative two-step RACH procedure comprises an additional offset between transmission of the additional request message and a starting time of the additional RAR window, wherein the additional offset is different than the initial offset.

Aspect 89: The method of any of Aspects 48-88, wherein a length of the initial RAR window is based at least in part on one or more measurements associated with a signal.

Aspect 90: The method of Aspect 89, wherein the one or more measurements comprise a synchronization signal block (SSB)-based reference signal received power (RSRP), and wherein the length of the initial RAR window is shorter than a length of an additional RAR window based at least in part the SSB-based RSRP satisfying a threshold.

Aspect 91: The method of any of Aspects 48-90, wherein the initial two-step RACH procedure comprises an initial downlink control information (DCI) carried by the initial response message, the initial DCI having a first size; and wherein the alternative two-step RACH procedure comprises an additional DCI carried by an additional response message, wherein the additional DCI has a second size that is different than the first size.

Aspect 92: The method of any of Aspects 48-91, wherein the initial two-step RACH procedure comprises an initial downlink control information (DCI) carried by the initial response message, the initial DCI comprising content associated with a first interpretation by the UE; and wherein the alternative two-step RACH procedure comprises an additional DCI carried by an additional response message, the additional DCI comprising content associated with a second interpretation by the UE, wherein the second interpretation is different than the first interpretation.

Aspect 93: An apparatus for wireless communication at a device, comprising a processor; memory coupled with the processor; and instructions stored in the memory and executable by the processor to cause the apparatus to perform the method of one or more Aspects of Aspects 1-47.

Aspect 94: A device for wireless communication, comprising a memory and one or more processors coupled to the memory, the memory and the one or more processors configured to perform the method of one or more Aspects of Aspects 1-47.

Aspect 95: An apparatus for wireless communication, comprising at least one means for performing the method of one or more Aspects of Aspects 1-47.

Aspect 96: A non-transitory computer-readable medium storing code for wireless communication, the code comprising instructions executable by a processor to perform the method of one or more Aspects of Aspects 1-47.

Aspect 97: A non-transitory computer-readable medium storing a set of instructions for wireless communication, the set of instructions comprising one or more instructions that, when executed by one or more processors of a device, cause the device to perform the method of one or more Aspects of Aspects 1-47.

Aspect 98: An apparatus for wireless communication at a device, comprising a processor; memory coupled with the processor; and instructions stored in the memory and executable by the processor to cause the apparatus to perform the method of one or more Aspects of Aspects 48-92.

Aspect 99: A device for wireless communication, comprising a memory and one or more processors coupled to the memory, the memory and the one or more processors configured to perform the method of one or more Aspects of Aspects 48-92.

Aspect 100: An apparatus for wireless communication, comprising at least one means for performing the method of one or more Aspects of Aspects 48-92.

Aspect 101: A non-transitory computer-readable medium storing code for wireless communication, the code comprising instructions executable by a processor to perform the method of one or more Aspects of Aspects 48-92.

Aspect 102: A non-transitory computer-readable medium storing a set of instructions for wireless communication, the set of instructions comprising one or more instructions that, when executed by one or more processors of a device, cause the device to perform the method of one or more Aspects of Aspects 48-92.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising: one or more memories; and
one or more processors, coupled to the one or more memories, configured to:
perform an initial random access channel (RACH) attempt by transmitting, to a network entity, an initial request message of an initial two-step RACH procedure,
wherein to transmit the initial request message, the one or more processors are configured to transmit an initial request message preamble according to an initial transmission procedure; and
perform an additional RACH attempt, using an alternative two-step RACH procedure, based at least in part on determining that an initial response message, corresponding to the initial request message, of the two-step RACH procedure is not received during an initial random access response (RAR) window,
wherein to perform the additional RACH using the alternative two-step RACH procedure, the one or more processors are configured to transmit at least one additional request message preamble according to an additional transmission procedure that is different than the initial transmission procedure,
wherein the at least one additional request message preamble comprises a plurality of preamble sequences, and
wherein each preamble sequence of the plurality of preamble sequences is linked to each other preamble sequence of the plurality of preamble sequences.

2. The UE of claim 1, wherein the one or more processors are further configured to:
obtain one or more measurements associated with a signal,
wherein the UE is to perform the additional RACH attempt based at least in part on the one or more measurements.

3. The UE of claim 2, wherein the one or more measurements comprise a synchronization signal block (SSB)-based reference signal received power (RSRP), and
wherein the UE is to perform the additional RACH attempt based at least in part on determining that the SSB-based RSRP satisfies a threshold.

4. The UE of claim 1, wherein the additional transmission procedure comprises a coverage-enhanced transmission procedure.

5. The UE of claim 1, wherein the initial transmission procedure is performed using a first transmit power, and wherein the additional transmission procedure is performed using a second transmit power that is higher than the first transmit power.

6. The UE of claim 1, wherein the initial transmission procedure is performed using a first subset of preamble sequences of a set of preamble sequences, and wherein the additional transmission procedure is performed using a second subset of preamble sequences of the set of preamble sequences, wherein the second subset of preamble sequences is different than the first subset of preamble sequences.

7. The UE of claim 1, wherein the initial transmission procedure is performed using a first subset of RACH occasions (ROs) of a set of ROs, and wherein the additional transmission procedure is performed using a second subset of ROs of the set of ROs, wherein the second subset of ROs is different than the first subset of ROs.

8. The UE of claim 1, wherein the initial transmission procedure is performed using an initial request message preamble format, and wherein the additional transmission procedure is performed using at least one additional request message preamble format, wherein the at least one additional request message preamble format is different than the initial request message preamble format.

9. The UE of claim 1, wherein the additional transmission procedure is performed using a plurality of transmissions, wherein the plurality of transmissions correspond to a plurality of RACH occasions (ROs).

10. The UE of claim 9, wherein each transmission of the plurality of transmissions is associated with a same synchronization signal block beam.

11. The UE of claim 9, wherein the plurality of ROs comprise a plurality of groups of ROs, wherein each of the plurality of groups of ROs functions as a virtual RO corresponding to the at least one additional request message preamble.

12. The UE of claim 1, wherein transmitting the at least one additional request message preamble comprises transmitting a preamble sequence of the plurality of preamble sequences in a plurality of transmissions.

13. The UE of claim 1, wherein transmitting the at least one additional request message preamble comprises transmitting each of the plurality of preamble sequences in a respective one of a plurality of transmissions.

14. The UE of claim 1, wherein each preamble sequence of the plurality of preamble sequences is linked to each other preamble sequence of the plurality of preamble sequences based at least in part on at least one of:
   a wireless communication standard,
   a configuration received from the network entity, or
   a combination thereof.

15. The UE of claim 1, wherein the plurality of preamble sequences comprises a subset of a set of preamble sequences, and wherein the one or more processors are further configured to receive, from the network entity, a configuration of the subset of the set of preamble sequences.

16. The UE of claim 15, wherein the configuration of the subset of the set of preamble sequences is carried in remaining minimum system information.

17. The UE of claim 1, wherein the one or more processors, to transmit the initial request message, are configured to transmit the initial request message according to an initial mapping of an initial RACH occasion (RO) onto an initial set of physical uplink shared channel (PUSCH) resources, and
   wherein the one or more processors, to perform the alternative two-step RACH procedure, are configured to transmit an additional request message according to an additional mapping of an additional RO onto an additional set of PUSCH resources.

18. The UE of claim 17, wherein the one or more processors, to transmit the initial request message, are configured to transmit an initial uplink reference signal (RS) using the initial set of PUSCH resources, and
   wherein performing the alternative two-step RACH procedure comprises transmitting an additional uplink RS using the additional set of PUSCH resources, wherein the additional uplink RS is to facilitate beam refinement associated with the network entity.

19. The UE of claim 1, wherein the one or more processors, to transmit the initial request message, are configured to transmit the initial request message according to an initial mapping of an initial RACH occasion (RO) to an initial set of physical uplink shared channel (PUSCH) resources, and
   wherein the one or more processors, to perform the alternative two-step RACH procedure, are configured to transmit a plurality of additional request messages according to an additional mapping of a plurality of additional ROs to a plurality of additional sets of PUSCH resources.

20. The UE of claim 19, wherein the one or more processors are further configured to receive an indication of a time domain offset between at least one of the plurality of additional ROs and at least one of the plurality of additional sets of PUSCH resources to which the at least one of the plurality of additional ROs is mapped.

21. The UE of claim 19, wherein the one or more processors are further configured to receive an indication of a frequency domain offset between at least one of the plurality of additional ROs and at least one of the plurality of additional sets of PUSCH resources to which the at least one of the plurality of additional ROs is mapped.

22. The UE of claim 1, wherein the one or more processors, to perform the initial two-step RACH procedure, are configured to monitor, according to an initial reception procedure, an initial physical downlink control channel (PDCCH) for the initial response message; and
   wherein performing the alternative two-step RACH procedure comprises monitoring, according to an additional reception procedure, an additional PDCCH for an additional response message that corresponds to an additional request message, wherein the additional reception procedure is different than the initial reception procedure.

23. The UE of claim 22, wherein the additional reception procedure comprises monitoring a plurality of PDCCH monitoring candidates associated with a plurality of monitoring occasions.

24. The UE of claim 23, wherein each of the plurality of monitoring occasions comprises the additional response message.

25. The UE of claim 23, wherein each of the plurality of PDCCH monitoring candidates indicates at least one of:
   an index associated with the additional response message,
   a particular location in a search space corresponding to each monitoring occasion associated with the PDCCH monitoring candidate, or
   a combination thereof.

26. The UE of claim 23, wherein the plurality of PDCCH monitoring candidates are associated with a plurality of slots.

27. A network entity for wireless communication, comprising:
   one or more memories; and
   one or more processors, coupled to the one or more memories, configured to:
   receive, from a user equipment (UE), an initial request message of an initial two-step random access channel (RACH) procedure,
   wherein the initial request message corresponds to an initial RACH attempt, and wherein to receive the initial request message, the one or more processors are configured to receive an initial request message preamble that is transmitted according to an initial transmission procedure; and
   receive an additional request message of an alternative two-step RACH procedure,
   wherein the additional request message corresponds to an additional RACH attempt performed by the UE based at least in part on a failure of the UE to receive an initial response message, corresponding to the initial request message, during an initial random access response (RAR) window,
   wherein to receive the additional request message, the one or more processors are configured to receive at least one additional request message preamble that is transmitted according to an additional transmission procedure that is different than the initial transmission procedure,
   wherein the at least one additional request message preamble comprises a plurality of preamble sequences, and
   wherein each preamble sequence of the plurality of preamble sequences is linked to each other preamble sequence of the plurality of preamble sequences.

28. The network entity of claim 27, wherein the one or more processors, to receive the at least one additional request message preamble, is further configured to:
receive each of the plurality of preamble sequences in a respective one of a plurality of transmissions.

29. A method of wireless communication performed by a user equipment (UE), comprising:
performing an initial random access channel (RACH) attempt by transmitting, to a network entity, an initial request message of an initial two-step RACH procedure,
wherein transmitting the initial request message comprises transmitting an initial request message preamble according to an initial transmission procedure; and
performing an additional RACH attempt, using an alternative two-step RACH procedure, based at least in part on determining that an initial response message, corresponding to the initial request message, of the two-step RACH procedure is not received during an initial random access response (RAR) window,
wherein performing the additional RACH using the alternative two-step RACH procedure comprises transmitting at least one additional request message preamble according to an additional transmission procedure that is different than the initial transmission procedure,
wherein the at least one additional request message preamble comprises a plurality of preamble sequences, and
wherein each preamble sequence of the plurality of preamble sequences is linked to each other preamble sequence of the plurality of preamble sequences.

30. A method of wireless communication performed by a network entity, comprising:
receiving, from a user equipment (UE), an initial request message of an initial two-step random access channel (RACH) procedure, wherein the initial request message corresponds to an initial RACH attempt,
wherein receiving the initial request message comprises receiving an initial request message preamble that is transmitted according to an initial transmission procedure; and
receiving an additional request message of an alternative two-step RACH procedure, wherein the additional request message corresponds to an additional RACH attempt performed by the UE based at least in part on a failure of the UE to receive an initial response message, corresponding to the initial request message, during an initial random access response (RAR) window,
wherein receiving the additional request message comprises receiving at least one additional request message preamble that is transmitted according to an additional transmission procedure that is different than the initial transmission procedure,
wherein the at least one additional request message preamble comprises a plurality of preamble sequences, and
wherein each preamble sequence of the plurality of preamble sequences is linked to each other preamble sequence of the plurality of preamble sequences.

* * * * *